United States Patent [19]
Staelin et al.

[11] Patent Number: 6,059,062
[45] Date of Patent: *May 9, 2000

[54] POWERED ROLLER SKATES

[75] Inventors: David H. Staelin, Wellesley; Jeffrey H. Lang, Sudbury, both of Mass.

[73] Assignee: EMPower Corporation, Cambridge, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/952,221

[22] PCT Filed: May 31, 1995

[86] PCT No.: PCT/US95/06984

§ 371 Date: Nov. 13, 1997

§ 102(e) Date: Nov. 13, 1997

[51] Int. Cl.[7] .................................................. B60K 1/00
[52] U.S. Cl. .................................... 180/181; 180/65.1
[58] Field of Search ............................ 180/180, 181, 180/65.1, 65.5, 65.6, 214, 220; 280/87.042

[56] References Cited

U.S. PATENT DOCUMENTS

| | | | |
|---|---|---|---|
| 4,456,089 | 6/1984 | Kuwahara | 180/180 |
| 5,487,441 | 1/1996 | Endo et al. | 180/181 |

FOREIGN PATENT DOCUMENTS

| | | | |
|---|---|---|---|
| 2620038 | 3/1999 | France | 180/180 |
| 683464 | 2/1965 | Italy | 180/180 |

Primary Examiner—Richard M. Camby
Attorney, Agent, or Firm—Fish & Richardson P.C.

[57] ABSTRACT

A powered roller skate including a foot support, multiple wheels mounted to the foot support, and a motor coupled to at least one of the wheels. The powered roller skate further includes an active control system having a sensor located on the skate and a controller. The controller receives electrical signals from the sensor and electrical signals from the motor, which indicate the state of the motor. In response to those signals and in accordance with a control mechanism, the controller sends electrical signals to the motor to control the operation of the motor.

223 Claims, 17 Drawing Sheets

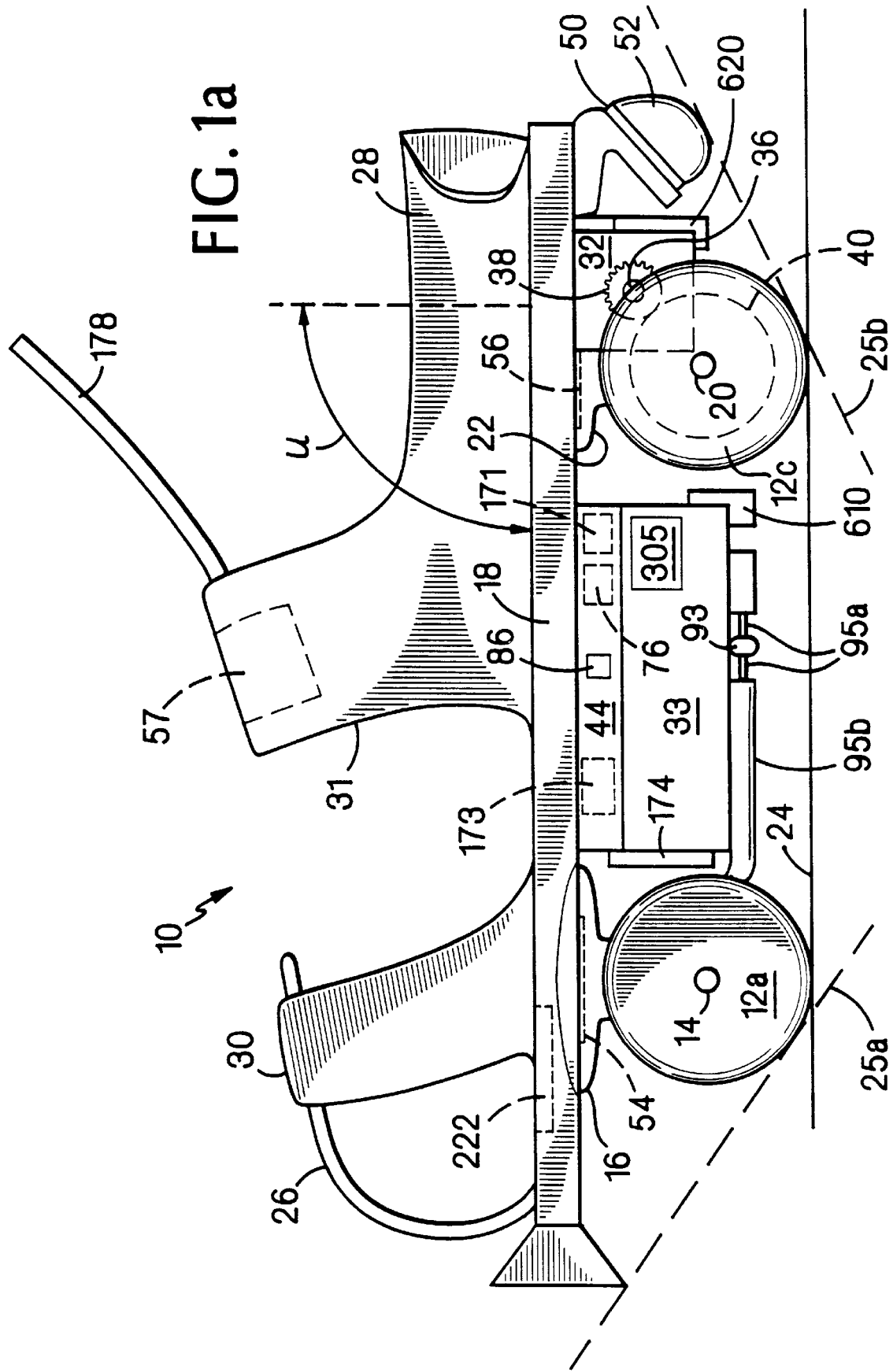

POWERED ROLLER SKATES

BACKGROUND

This invention relates to powered, lightweight, individualized personal transport methods and apparatus, and more particularly, to powered roller skates.

Power has been applied to the wheels of roller skates in many different ways. Often, the motor is worn on the user's back and connected to the roller skate's wheels through a flexible drive. Alternatively, the motor is mounted to the roller skate and directly connected to the roller skate's wheels. Where the motor is an internal combustion engine, a fuel tank is required, and the fuel tank is either worn by the user or mounted to the roller skate.

Generally, speed control is provided by a hand- or foot-controlled mechanical device, for instance, hip handles or a tiltable foot support. The hand controlled devices may be electrically connected to the motor for direct control or may include a wireless transmitter for remote control. Hand controls can be awkward, unnatural, and possibly dangerous when sudden changes occur. A user can initiate braking or motor-starting through a tiltable foot support by depressing or tilting the forward or rear portions of the foot support platform. The roller skate's foot support has also included devices to assist in steering, for example, a pivoted sole piece. These foot-controlled devices often require significant foot motion and sometimes impact the trailing less-weighted and less-effective foot. As a result, the foot-controlled devices can be difficult to operate.

SUMMARY

In one aspect, the invention relates to a powered roller skate having a foot support, multiple wheels mounted to the foot support, and a motor coupled to at least one of the wheels. The invention features an active control system having at least one sensor located on the skate and a controller. The controller receives electrical signals from the sensors and further, electrical signals from the motor which indicate the state of the motor. In response to those signals and, in accordance with a control mechanism, the controller sends electrical signals to the motor to control the operation of the motor.

In another aspect, the invention relates to a powered roller skate having a foot support, multiple wheels mounted to the foot support, and a motor coupled to at least one of the wheels. The invention features an active control system having at least one sensor, at least one detector for detecting an operational mode of the skate, and a controller. The controller receives electrical signals from the sensors and further electrical signals from the detectors which indicate the operational mode of the skate and electrical signals from the motor which indicate the state of the motor. In response to those signals and, in accordance with the selected operational mode and a control mechanism, the controller sends electrical signals to the motor to control the operation of the motor.

In another aspect, the invention relates to a pair of powered roller skates where each skate has a foot support, multiple wheels mounted to the foot support, and a motor coupled to at least one of the wheels. The invention features a controller and an active control system having a communication system for communicating with the other skate. The controller receives electrical signals from the communication system and further electrical signals from the motor which indicate the state of the motor. In response to those signals and, in accordance with a control mechanism, the controller sends electrical signals to the communication system to aid in coordinating movement of the pair of skates and to the motor to control the operation of the motor.

In another aspect, the invention relates to an automatic braking system for use with a powered roller skate having multiple wheels. The invention features determining means which determine when the skate has been stationary for a predetermined amount of time and which send an electrical signal indicating such determination to preventing means which respond to the electrical signal by preventing at least one of the wheels from turning. The invention also features detecting means which detect a restart trigger and which send an electrical signal indicating such detection to the preventing means which allows the wheels to turn.

In another aspect, the invention relates to an automatic acceleration system for use with a powered roller skate having multiple wheels and a motor coupled to at least one of the wheels. The invention features detecting means which detect a start trigger and which send an electrical signal that indicates such detection to a causing means which accelerates the skate.

In another aspect, the invention relates to a powered roller skate having a foot support, multiple wheels mounted to the foot support, and a motor coupled to at least one of the wheels. The invention features an active control system having a controller and a communication mechanism for communicating information about the skate external to the skate. The controller receives electrical signals from the communication mechanism and, in accordance with a control mechanism, sends electrical signals to the communication mechanism to cause the communication mechanism to indicate a status of the skate external to the skate.

In another aspect, the invention relates to a powered roller skate having a foot support, multiple wheels mounted to the foot support, and a motor coupled to at least one of the wheels. The invention features an active control system having a controller and a communication device for communicating information about the skate external to the skate. The controller sends electrical signals to the communication device to cause the communication device to indicate a status of the skate external to the skate. The controller receives electrical signals from the communication device and, in accordance with a control mechanism, modifies the control mechanism and control parameters to update the control mechanism.

In another aspect, the invention relates to a powered roller skate having a foot support, multiple wheels mounted to the foot support, and a motor coupled to at least one of the wheels. The invention features an active control system having at least one sensor and a controller. The controller receives electrical signals from the sensor and, in accordance with a control mechanism, modifies control parameters to update the control mechanism.

In another aspect, the invention relates to a security system for use with a powered roller skate having multiple wheels. The invention features detecting means which detects an end-of-use trigger and which sends an electrical signal indicating such detection to preventing means which responds to the electrical signal by preventing at least one of the wheels from turning. The invention also features another detecting means which detects a security trigger and which sends an electrical signal indicating such detection to the preventing means which responds by allowing the wheels to turn.

In another aspect, the invention relates to a powered roller skate having a foot support, multiple wheels mounted to the foot support, and a motor coupled to at least one of the wheels. The invention features an active control system having a controller and at least one detector that detects when the skate is set down on a surface. The controller receives electrical signals from the detector and further electrical signals from the motor which indicate the state of the motor and, in accordance with a control mechanism, sets the motor torque to cause the motor to maintain a skate velocity established when the skate was last set down on a surface.

In another aspect, the invention relates to a powered roller skate having a foot support, multiple wheels mounted to the foot support, and a motor coupled to at least one of the wheels. The invention features an active control system having a controller and at least one detector that detects a user's weight distribution across the foot support. The controller receives electrical signals from the detector and further electrical signals from the motor which indicate the state of the motor and, in accordance with a control mechanism, sends electrical signals to the motor to activate the motor such that skate velocity is increased and decreased according to the user's weight distribution across the foot support.

In another aspect, the invention relates to a powered roller skate having a foot support, multiple wheels mounted to the foot support, and a motor coupled to at least one of the wheels. The invention features an active control system having a controller and at least one detector that detects an angle between a user's foot and lower leg. The controller receives electrical signals from the detector and further electrical signals from the motor which indicate the state of the motor and, in accordance with a control mechanism, sends electrical signals to the motor to activate the motor such that skate velocity is increased and decreased according to the angle between the user's foot and lower leg.

In another aspect, the invention relates to a powered roller skate having a foot support, multiple wheels mounted to the foot support, and a motor coupled to at least one of the wheels. The invention features an active control system having a controller and at least one detector that detects a position of another powered roller skate. The controller receives electrical signals from the detector and further electrical signals from the motor which indicate the state of the motor and, in accordance with a control mechanism, sends electrical signals to the motor to activate the motor such that skate velocity is increased and decreased according to the position of the other powered roller skate.

In another aspect, the invention relates to a powered roller skate having a foot support, multiple wheels mounted to the foot support, and a motor coupled to at least one of the wheels. The invention features an active control system having a controller and at least one detector that detects an exercise mode of the skate. The controller receives electrical signals from the motor which indicate the state of the motor and further electrical signals from the detector which indicate the exercise mode and, in accordance with a control mechanism, sends electrical signals to the motor to cause the motor to apply a resisting torque to one or more of the plurality of wheels.

In another aspect, the invention relates to an electrically powered transportation means having two roller skates. Each roller skate includes a foot support, multiple wheels mounted to the foot support, and an electric motor coupled to at least one of the wheels. Each roller skate also includes a wheel locking mechanism mechanically coupled to at least one of wheels. The invention features an active control system having a sensor and a controller coupled to the sensor. The controller receives electrical signals from the sensor and further electrical signals from the motor which indicate the state of the motor and, in accordance with a control mechanism, sends electrical signals to the motor to control the operation of the motor.

Embodiments of the invention may include one or more of the following advantages: For example, sensors send electrical signals to the controller which represent the natural skating motions of the user. Using these natural skating signals and electrical signals from other sensors representing motor status (for example, temperature) and electrical signals from the motor representing the actual state of the motor (for example, torque, velocity, temperature), the controller actively controls the operation of the motor, and, hence, the roller skate. The roller skate responds to the user's natural skating motions without requiring the user to move hand- or foot-controls (hands-off, lever-less). Thus, the roller skate anticipates the user's intentions without introducing user instability.

Additionally, the actively controlled motor provides increased safety features including reducing both unwanted backward momentum and the need for lateral forces to promote forward locomotion. The controller also provides multiple roller skating modes which provide the user with many skating options. The natural transition between the skating modes is accomplished with minimal user attention and, thus, does not introduce user instability. A wheels-locked or wheels-retracted mode permits a user to walk through areas where wheeled transportation is inappropriate or dangerous, such as on public conveyances or on stairways. Many wheel configurations are also possible, for example: two forward and two backward; one forward and two backward; one forward, one rearward, and two centered; or two or more wheels in an in-line configuration. Additionally, there are many mechanisms for attaching the roller skate to a user's foot, for instance: restraining straps that wrap around a user's foot, with or without a shoe; or a restraining boot that envelopes a user's foot, with or without a shoe.

BRIEF DESCRIPTION OF THE DRAWINGS

FIG. 1a, is a side view of one embodiment of a powered roller skate according to the invention.

DETAILED DESCRIPTION

Figure 1B:
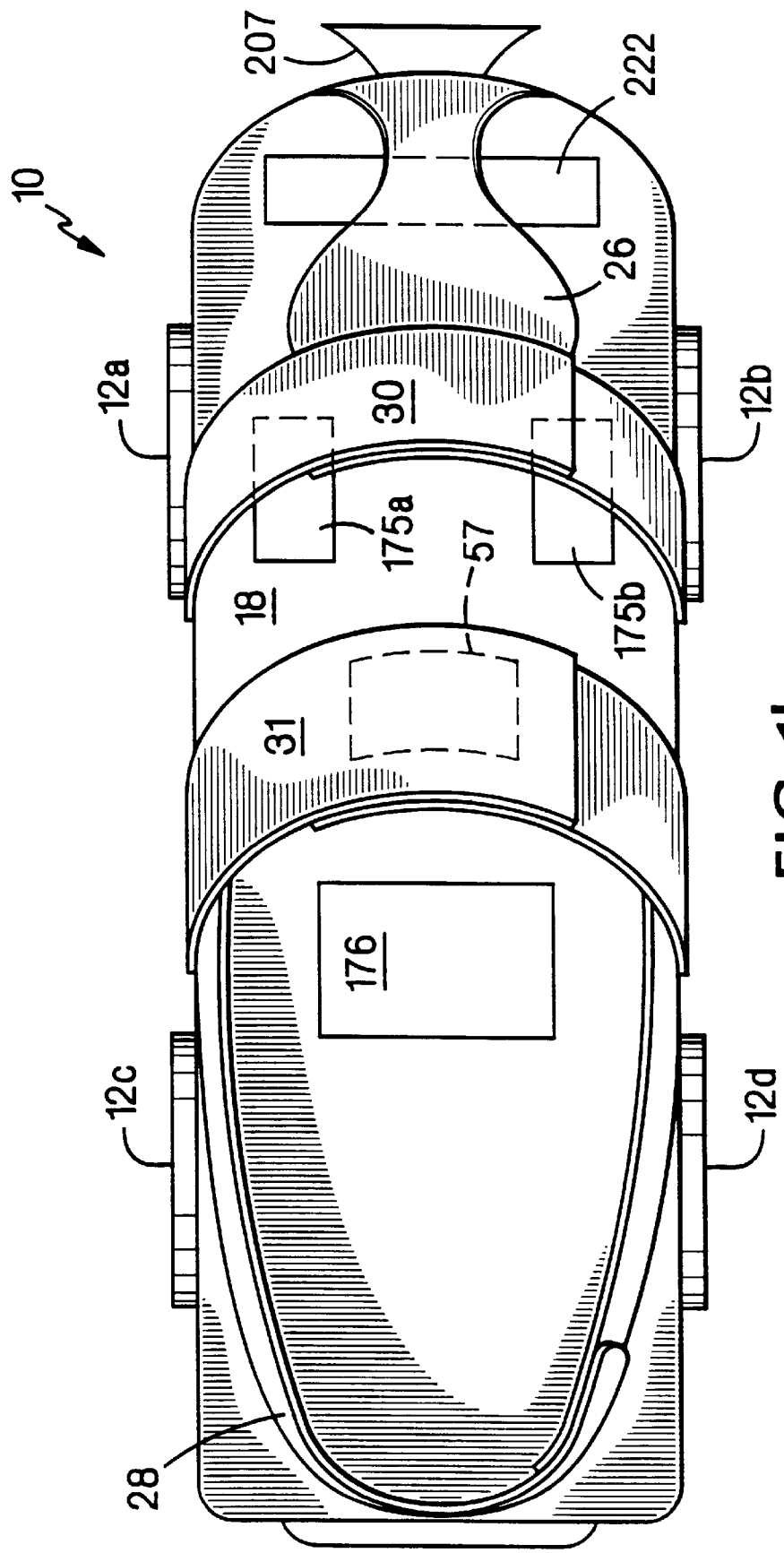
FIG. 1b is a top view of one embodiment of a powered roller skate according to the invention.
Figure 1C:
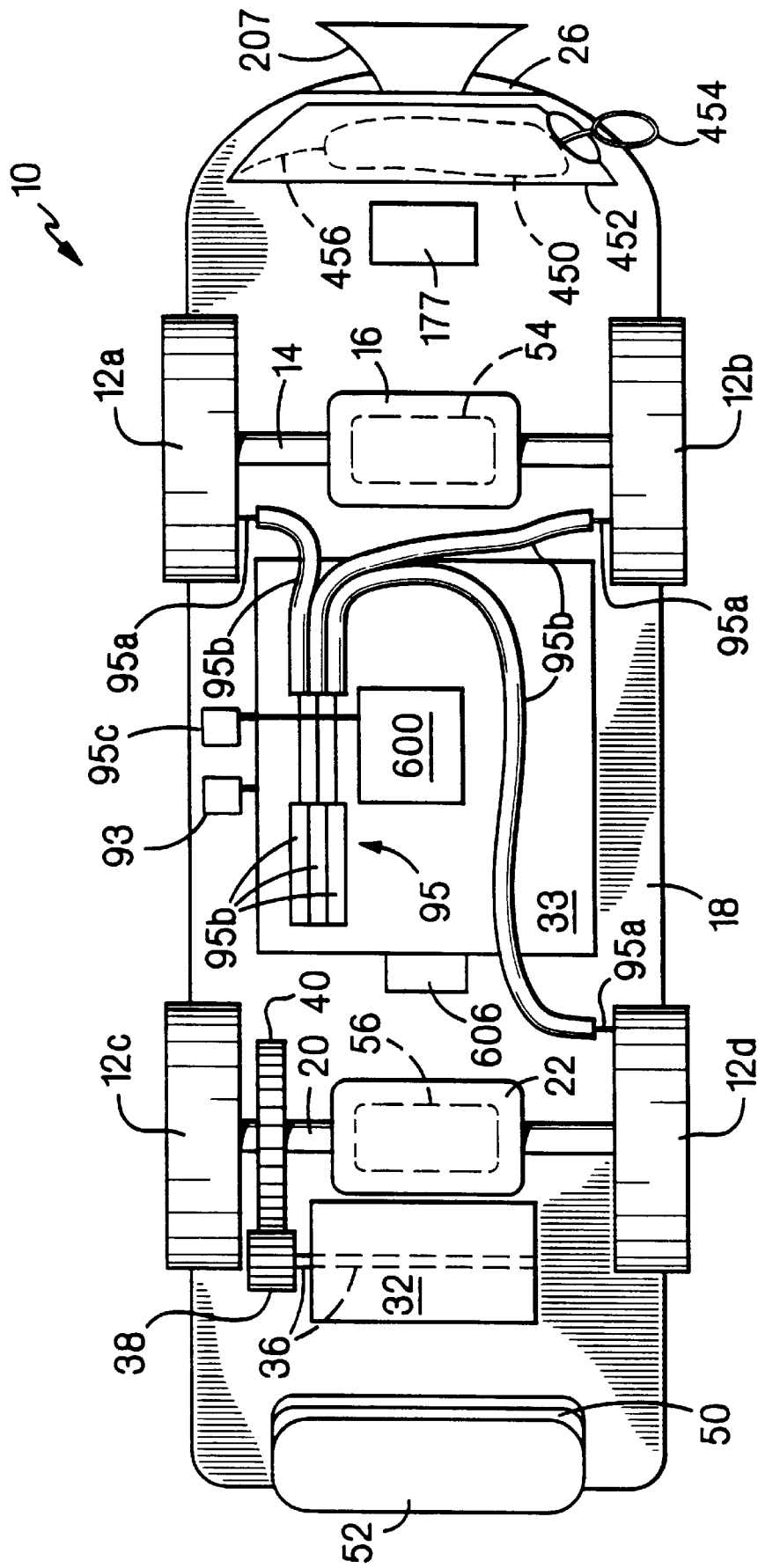
FIG. 1c is a bottom view of one embodiment of a powered roller skate according to the invention.

Referring to FIGS. 1a, 1b, and 1c, a roller skate 10 includes two front wheels 12a and 12b and two rear wheels 12c and 12d. Front wheels 12a, 12b spin about an axle 14 that is supported by an axle-support assembly 16 mounted to a foot support 18, and rear wheels 12c, 12d spin about an axle 20 that is supported by an axle-support assembly 22 also mounted to foot support 18. The wheels support the user above a surface 24, for example, a road, in a balanced fashion that minimizes undesirable ankle torque. To facilitate both skating and walking (walking is described below), wheels 12a, 12b, 12c, and 12d are located inward from the front and rear of the skate, respectively. The user is able to tilt the skate forward at an angle (illustrated by dashed line 25a) and backward at an angle (illustrated by dashed line 25b), where the resulting forward and rearward centers of support (that is the wheels) are located roughly under either the ball of the foot or the heel of the foot. If the front wheels are too far forward, too much effort is required to step off from the toe, and if the rear wheels are too far backward, too much exertion is required to step smoothly forward. Conversely, if the wheels are too close together then it becomes more difficult for the skater to maintain balance.

Adjustable (for example, Velcro®) foot restraining straps, including a toe strap 26, a heel strap 28, an upper-foot binding strap 30, and an ankle strap 31 are mounted to foot support 18 for firmly securing a user's foot (with or without a shoe, not shown) to foot support 18. Only heel strap 28 or ankle strap 31 are typically fastened or unfastened upon each repetitive wearing of the skate by a single user. Both heel strap 28 and ankle strap 31 have sufficient give and tension to largely prevent the user from accidentally withdrawing his or her heel from the skate.

Roller skate 10 further includes a battery-driven electric motor 32 and a battery pack 33 mounted to foot support 18. Battery pack 33 contains, for example, eight D-cell NiCd rechargeable batteries and is electrically coupled to motor 32 through a power electronics unit 76 to supply electricity to motor 32. Motor 32 is mechanically coupled to rear wheel 12c through a pair of gears 38, 40. Larger gear 40 is centered around and attached to rear wheel axle 20, while smaller gear 38 is centered around and attached to a motor axle 36. The surfaces of gears 38, 40 engage to enable motor 32 to apply torque to rear wheel axle 20, and because gear 40 is, for example, four times larger than gear 38, the combination multiplies the motor torque applied to rear wheel axle 20. The surfaces of gears 38, 40, may be toothed or toothless. Alternatively, gears 38, 40 may be replaced by a toothed belt drive providing the same gear ratio. Motor 32 is preferably a brushless, permanent magnet motor that experiences substantially no mechanical wear and is configured to regenerate power to recharge the rechargeable batteries in battery pack 33 or drive external equipment (not shown) when wheels 12c and 12d are rotated without being driven by motor 32, for example, if the user skates with his or her own physical effort or rolls down a hill.

A controller 44 is also mounted to foot support 18 and is electrically connected to battery pack 33 to receive electricity from battery pack 33. Controller 44 is also electrically connected to several sensors, including four user pressure sensors, (for example, force sensitive resistors of the kind manufactured by Interlink Electronics): a heel brake sensor 50 imbedded within a heel skid pad 52; a forward weight distribution sensor 54 imbedded within front axle support assembly 16; a rearward weight distribution sensor 56 imbedded within a rear axle support assembly 22, and a force gauge sensor 57 imbedded within ankle strap 31 adjacent to the user's ankle/lower leg when the user's foot is supported by foot support 18. One method of stopping roller skate 10 requires the user to push (that is drag) heel skid pad 52 against road surface 24. An alternate method of stopping roller skate 10 replaces heel skid pad 52 with a friction wheel (not shown) that rolls without skidding and which has a friction surface located elsewhere to provide braking with less wear. The friction between the heel skid pad and the road surface will cause the roller skate to slow down and eventually stop. When the user pushes heel skid pad 52 or the friction wheel against the road surface, heel brake sensor 50 detects an amount of pressure and sends an electrical signal representing the amount of pressure to controller 44. In response to this signal, controller 44 sends electrical signals to motor 32, through power electronics unit 76, causing motor 32 to apply reverse torque, in an amount corresponding to the amount of detected pressure, to rear wheel axle 20 to further slow or stop roller skate 10. Forward weight sensor 54 measures the distribution of the user's weight on the forward portion of the foot support, while rearward weight sensor 56 measures the distribution of the user's weight on the rearward portion of the foot support. Both forward and rearward weight distribution sensors 54, 56 send electrical signals to controller 44 indicating the distribution of weight on the associated portions of foot support 18. Force gauge 57 measures the angle between the user's foot and lower leg by detecting increased pressure when the user leans forward from the ankle (in other words, in one embodiment, increased pressure indicates that the user is skating faster) and by detecting decreased pressure when the user leans backwards (in other words, the user is maintaining speed, slowing down, or falling). Force gauge 57 sends electrical signals to controller 44 indicating the angle between the user's foot and lower leg. In response to the electrical signals from weight distribution sensors 54, 56 and force gauge sensor 57, controller 44 sends electrical signals to motor 32, through power electronics unit 76, to cause motor 32 to provide forward or reverse torque, in an amount corresponding to the detected forward and rearward distribution of the user's weight and the detected degree of the angle between the user's foot and lower leg, to rear wheel axle 20 to accelerate or brake roller skate 10. The operation of controller 44 will be discussed in more detail below. Here and throughout, references to force gauges, strain gauges, and pressure sensors should be understood to be nearly interchangeable because pressure applied to any surface where a pressure sensor may be usefully mounted normally results in a force or strain on one or more other surfaces where an equivalent force or strain sensor could be placed.

Figure 2:
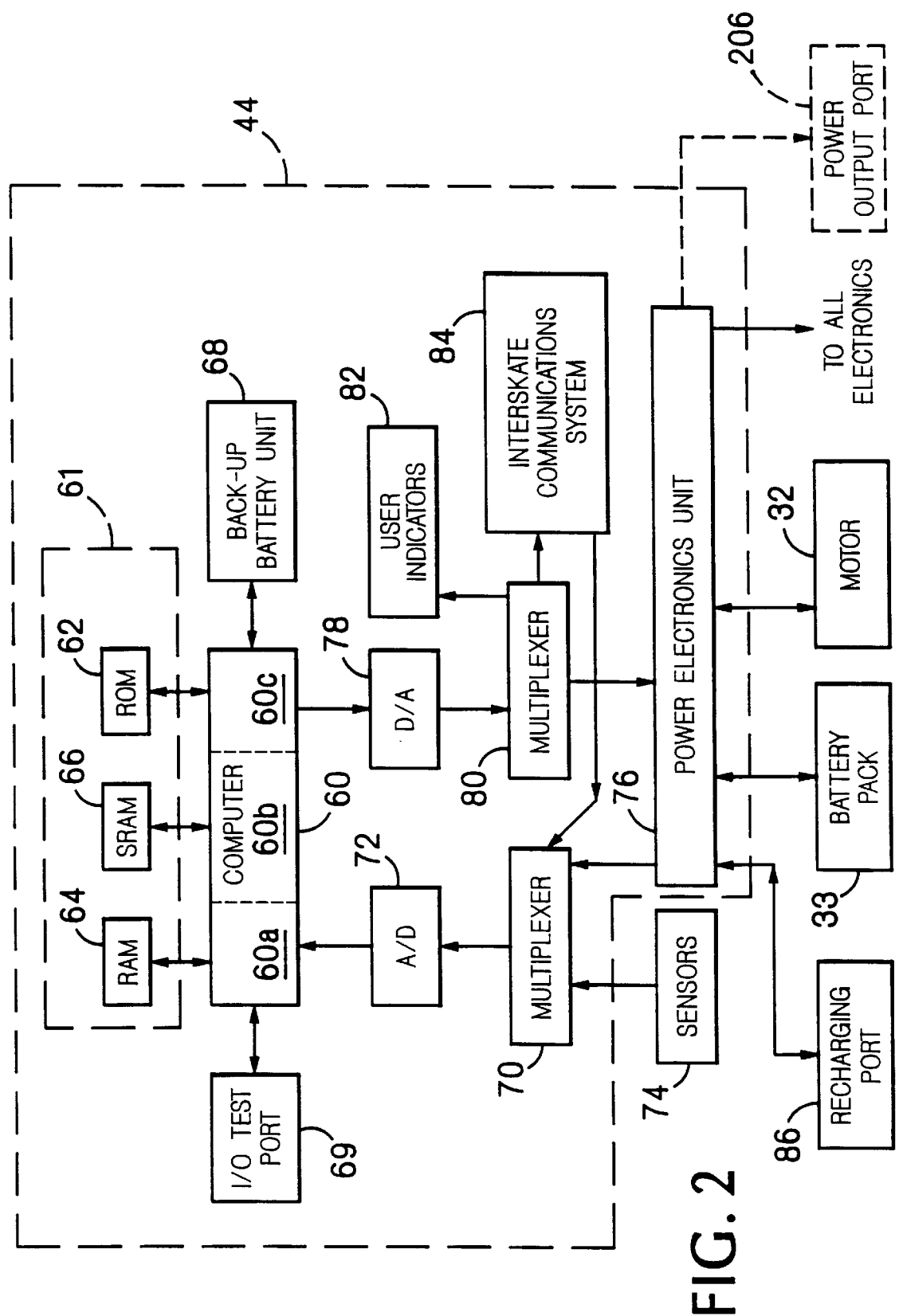
FIG. 2 is a block diagram representing electrical components of a controller and the interconnections between the controller's electrical components and other electrical components of the powered roller skate of FIGS. 1a, 1b, 1c.

Referring to FIG. 2, controller 44 includes a computer 60 connected to a memory 61 which includes nonvolatile Read Only Memory 62 (ROM) and volatile Random Access Memory 64 (RAM) and Static RAM 66 (SRAM). Computer 60 includes a central processing unit 60a, a clock 60b, and other electronic components 60c to provide total computer functionality. Through Input/Output (I/O) port 69, computer 60 is connected to an external I/O bus (for example, Small Computer System Interconnect, SCSI, not shown). Through I/O port 69 and computer 60, computer programs stored in memory 61 for execution by the central processing unit of computer 60 are monitored, tested, and modified. Computer 60 is also directly connected to a back-up battery power unit 68 which provides computer 60 with power to enable computer operation if battery pack 33 fails or in the temporary absence of battery pack 33. Back-up battery power unit 68 has a normal life of many years.

Through a multiplexer 70, an Analog to Digital (A/D) converter 72 receives analog signals from either power electronics unit 76, user sensors 74, or an interskate communication system 84. A/D converter 72 converts these analog signals into digital signals before sending them to computer 60. Power electronics unit 76 receives signals from motor sensors (not shown) within motor 32, including various temperature and voltage sensors (not shown), indicating motor status and transmits these signals through multiplexer 70 and A/D converter 72 to computer 60. User sensors 74 include the pressure sensors (50, 54, 56, 57 FIG. 1a) described above, as well as, a mode switch 93 (FIGS. 1a, 3).

Computer 60 sends digital signals to a Digital to Analog (D/A) converter 78 which converts the digital signals to analog signals before sending them through a multiplexer 80 to power electronics unit 76, user indicators 82, or interskate communication system 84. Power electronics unit 76 sends the signals received from multiplexer 80 to motor 32 to control the operation of motor 32. User indicators 82 convey information to the user and include small flashing lights for indicating proper or improper skate operation and acoustic beepers for indicating mode changes, range remaining with current battery power, and excess speed. Interskate communications system 84 sends information to and receives information from (that is communicates with) a corresponding interskate communication system (not shown) on another roller skate worn by the same user. The corresponding interskate communication systems share braking, velocity, acceleration, foot-position, security, and other mode change information to permit improved user control. Interskate communications are provided through coded very-low-power modulated magnetic dipole near-field radiation (inductive coupling) at frequencies above approximately 100 Hz. This very-low-power radiation is not easily subject to external interference and does not generate significant external interference. Acoustic signals above 20 kHz, near-field electric radiation, optical flashes, and similar means can also be used.

Power electronics unit 76 receives electrical power from battery pack 33 and disburses electrical power to all electronics coupled to the roller skate. Battery pack 33 preferably includes rechargeable batteries which do not have to be replaced as often as non-rechargeable batteries. A recharging port 86, configured to connect to either a standard wall outlet or to a standard external battery charger, is electrically connected to power electronics unit 76. When recharging port 86 is connected to an external power source or when the skate is being electrically braked while the user propels the skate, power electronics unit 76 recharges the batteries in battery pack 33.

Figure 3:
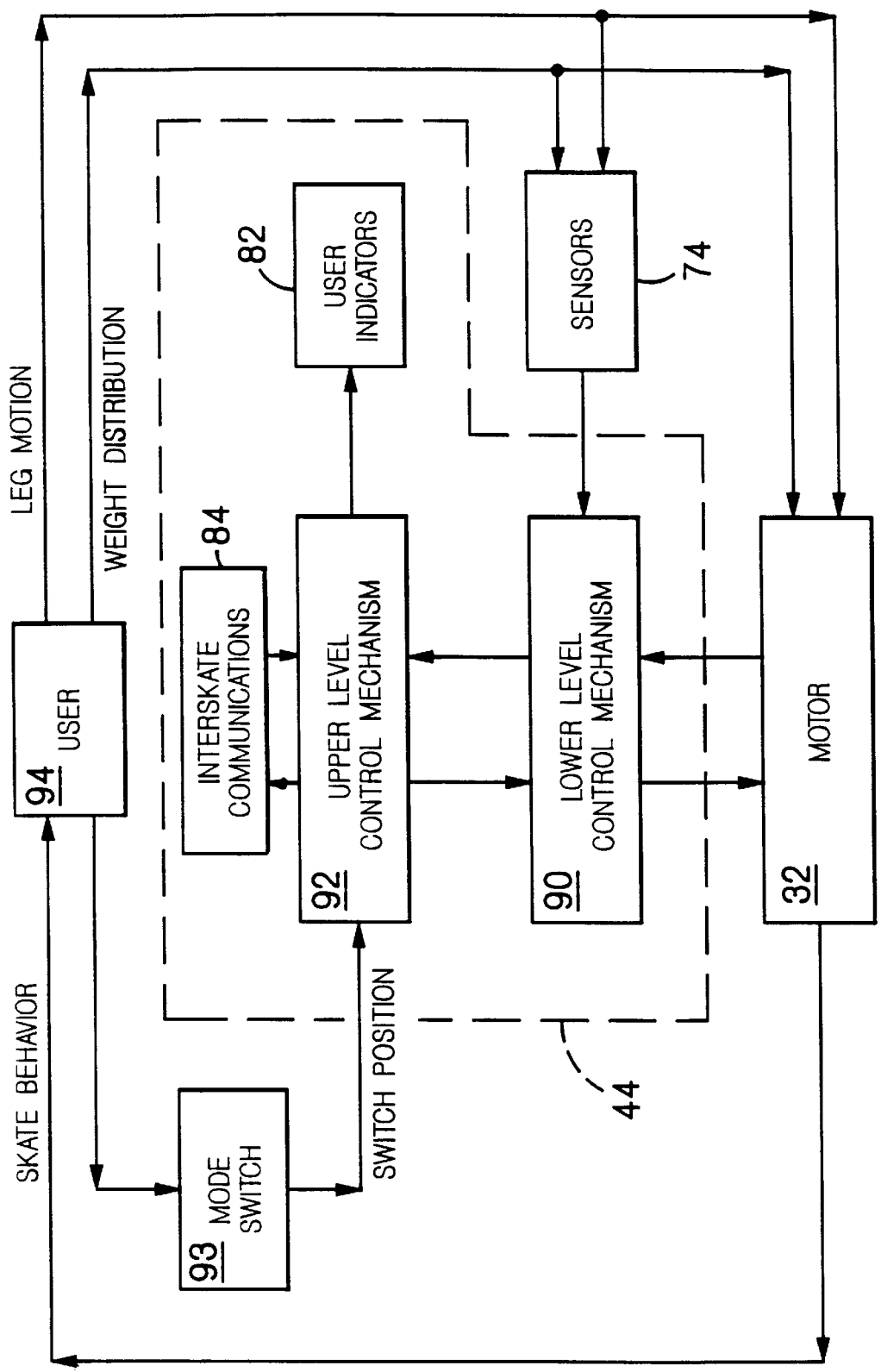
FIG. 3 is a block diagram representing interconnections between functional components, including an upper and a lower level control mechanism, of the powered roller skate of FIGS. 1a, 1b, 1c.

Referring to FIG. 3, controller 44 includes a lower level control mechanism 90 that sends and receives signals to and from motor 32 and measures (or accurately estimates) the actual motor torque (T), motor angular velocity ($\omega$), and change in motor angular velocity ($\delta\omega/\delta t$), as well as the temperature of motor 32, power electronics unit 76, and battery pack 33. Lower level control mechanism 90 then sends this information to an upper level control mechanism 92 also within controller 44. With this information, as well as, an input from mode switch 93 indicating skating mode and a vector "a" consisting of a set of coefficients ($a_1$, $a_2$, $a_3$, $a_4$, $a_5$ . . . ), upper level control mechanism 92 calculates a target torque (T*), a target motor angular velocity ($\omega$*), and a target braking rate ($\delta\omega/\delta t$)* (in other words, target change in motor angular velocity with respect to time; acceleration). Upper level control mechanism 92 then sends this data to lower level control mechanism 90 and indicates which of these values will control the operation of lower level control mechanism for a next predetermined time period (that is clock cycle). This data provides the parameters which determine the operation of lower level control mechanism 90 and, therefore, the operation of motor 32.

In lower level control mechanism 90, the desired motor current in an excited winding is i(t)* and is determined as explained later in reference to FIG. 5. For purposes of discussion, a simplified alternative definition for i(t)* is $i(t)^* = I_{max} T^*/T_{max}$, provided the magnitude of i(t)* never exceeds $I_{max}$; when the magnitude of T* exceeds $T_{max}$, $i(t)^* = I_{max} \text{sgn}(T^*)$. $T_{max}$ is the maximum torque and equals:

$$T_{max} = a_1$$

where $a_1$ depends on motor and motor drive capabilities, and $I_{max}$ is the maximum current and equals:

$$I_{max} = a_4,$$

and $a_4$ is determined as a declining function of motor and power electronics temperatures, to prevent overheating. In addition, in this simplified alternative definition for i(t)*, the desired torque is $$T^* = a_1(1 - exp(-a_2(\omega^*-\omega) - a_3(\delta\omega/\delta t)^*)) sgn(\omega^*-\omega).$$

Here $a_2$ and $a_3$ are mode dependent. These modes are described later. For Mode 3, the term $a_3(\delta\omega/\delta t)^*$ would generally be zero, and for Modes 4, 5, and 6 the relative values of $a_2$ and $a_3$ can be selected by the manufacturer or user to provide the desired responsiveness of these modes. For example, if $a_3(\delta\omega/\delta t)^*$ is zero, then the degree of weight-distribution, foot-angle, and foot-position for Modes 4, 5, and 6, respectively, would principally establish the target velocity, and, thus, these weight-distributions, foot-angles, or foot-positions would have to be maintained for so long as the user wished to continue at that target velocity. At the other extreme, where $a_2(\omega^*-\omega)$ is zero the user's degree of weight-distribution, foot-angle, and foot-position for Modes 4, 5, and 6, respectively, would principally establish the target acceleration, and thus, the user would return to a more normal relaxed weight-distribution, foot-angle, and foot-position once the desired velocity was obtained. These nominal relaxed values for weight-distribution, foot-angle, and foot-position may be surrounded by a "dead band" in which small departures in weight-distribution, foot-angle, and foot-position for Modes 4, 5, and 6, respectively, have no effect; only larger excursions beyond defined thresholds would produce positive or negative accelerations. If both terms are non-zero, then the result is a combination of these two user characteristics.

Through upper level control mechanism 92 and interskate communication system 84, data representing the estimated actual torque, T, angular velocity, ω, and rate of change in angular velocity, (δω/δt), is sent to a corresponding inter-skate communication system (not shown) on another roller skate (not shown) worn by the same user (indicated by box 94). Hence, when braking (that is deceleration) is indicated, the upper level control mechanisms of both skates (that is skate "x" and skate "y") send data to the corresponding lower level control mechanism indicating a new target angular velocity, ω*, and a rate of change (that is, a decrease) in angular velocity (δω/δt), such that $$\omega^*_{avg}=[(\omega_x+\omega_y)/2]^*=f(B^*)$$

is a function of the desired braking B*, indicated by pressure on a skid brake or other brake sensor or, in Mode 4, by a rearward weight distribution, and $$[(\delta\omega_x/\delta t)^*-(\delta\omega_y/\delta t)^*]=[(T_x-T_y)a_5].$$

The coefficient $a_5$ is defined to provide the desired effective resistance to differential user-applied forces attempting to change skate separation along the line of skate motion; $a_5$ may further be a function of:

$$[(\delta\omega_x/\delta t)^*-(\delta\omega_y/\delta t)^*].$$

This data, sent to each lower level control mechanism, causes the lower level control mechanisms to decrease the average velocity of the two skates (x and y) without mandating how each skate individually decelerates. This flexibility allows the user to position his feet as he desires during the braking process while still allowing him to brake. The vector component $a_5$ determines the skate resistance to user forces and is designed to alter skate separation along the direction of motion.

Through mode switch 93, the user selects one of six operational modes, including: Mode 1, a wheels-locked mode; Mode 2, a normal skating mode; Mode 3, a velocity maintenance mode; Mode 4, a weight-distribution sensitive, directed power mode; Mode 5, a leg-angle sensitive, directed power mode; and Mode 6, a foot-position sensitive, directed power mode. In the wheels-locked mode, the wheels are prevented from moving with a mechanical lock 95 by wires 95a which are slid into spoke-like indentations (not shown) on each freely rotating wheel 12a, 12b, 12d. Wires 95a slide within rigid guide-tubes 95b, which are attached to battery pack 33, and are advanced and retracted by the user through a finger-actuated sliding brake switch 95c. Alternatively, finger switch 95c can be replaced by braking motor 600 (FIG. 1c) which slides wires 95a within rigid guide-tubes 95b. Mode switch 93 and finger switch 95c can be combined into one switch. The user can walk normally, although with heavy "shoes," when the skates are in the wheels-locked mode. In the normal skating mode, controller 44 sends electrical signals to motor 32 to cause motor 32 to compensate for motor friction such that the skates respond to the user's skating motions in substantially the same way as unpowered roller skates, and in the velocity maintenance mode, controller 44 sends electrical signals to motor 32 to cause motor 32 to maintain the wheel velocity established immediately after the skate was last set down on the road. In Mode 4, the weight sensitive, directed power mode, controller 44 sends electrical signals to motor 32 to cause motor 32 to accelerate and decelerate the rear wheels in response to the user's forward or rearward weight distribution (weight sensors 54, 56, FIG. 1a). In Mode 5, the leg angle sensitive, directed power mode, controller 44 sends electrical signals to motor 32 to cause motor 32 to accelerate and decelerate the rear wheels in response to the angle between the user's foot and lower leg. Similarly, in Mode 6, the foot position sensitive, directed power mode, controller 44 sends electrical signals to motor 32 to cause motor 32 to accelerate and decelerate the rear wheels in response to the relative position of two powered roller skates worn by the same user.

Figure 4A:
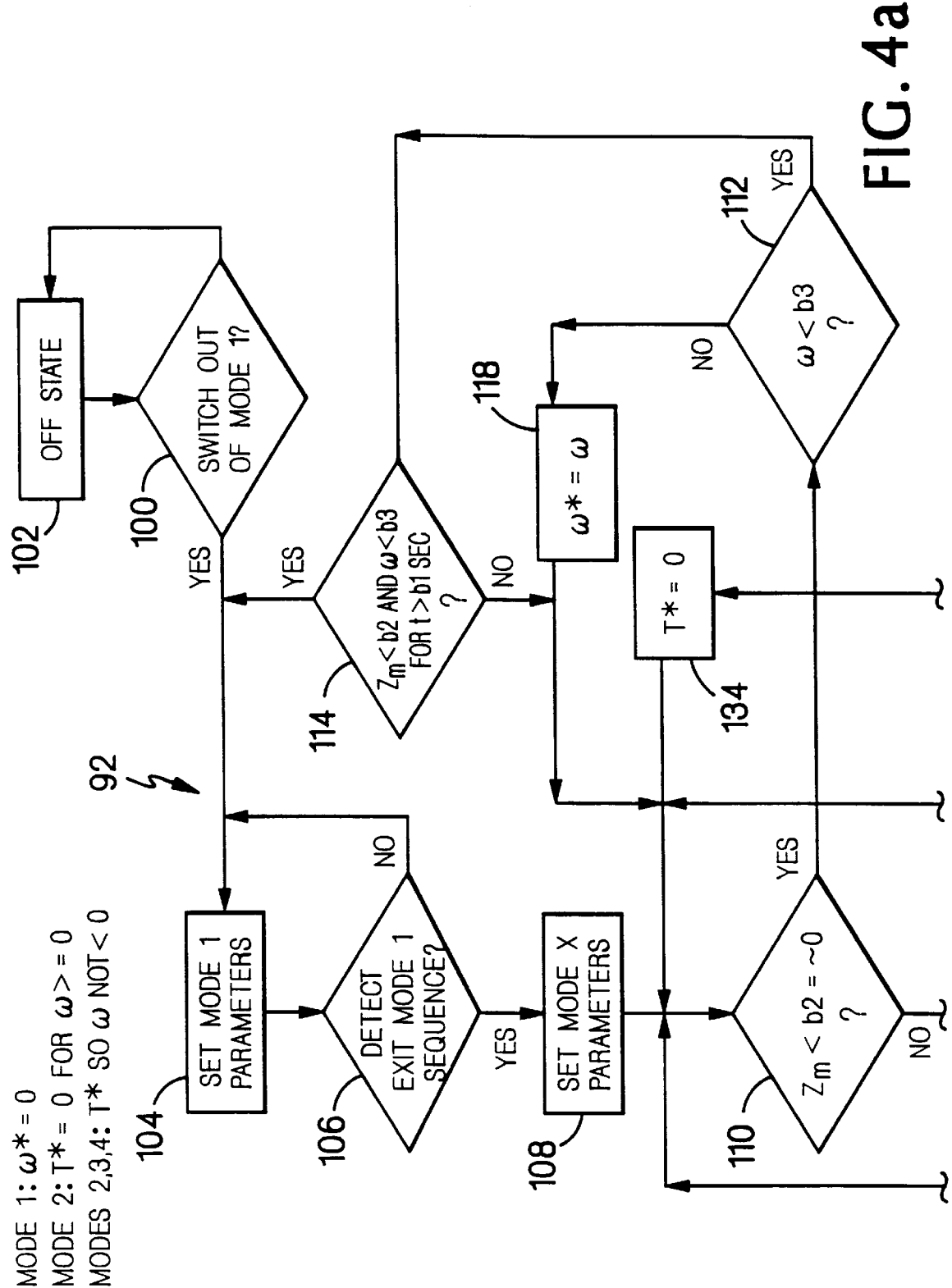
FIG. 4 is flow chart representing the operation of the upper level control mechanism of FIG. 3.
Figure 4B:
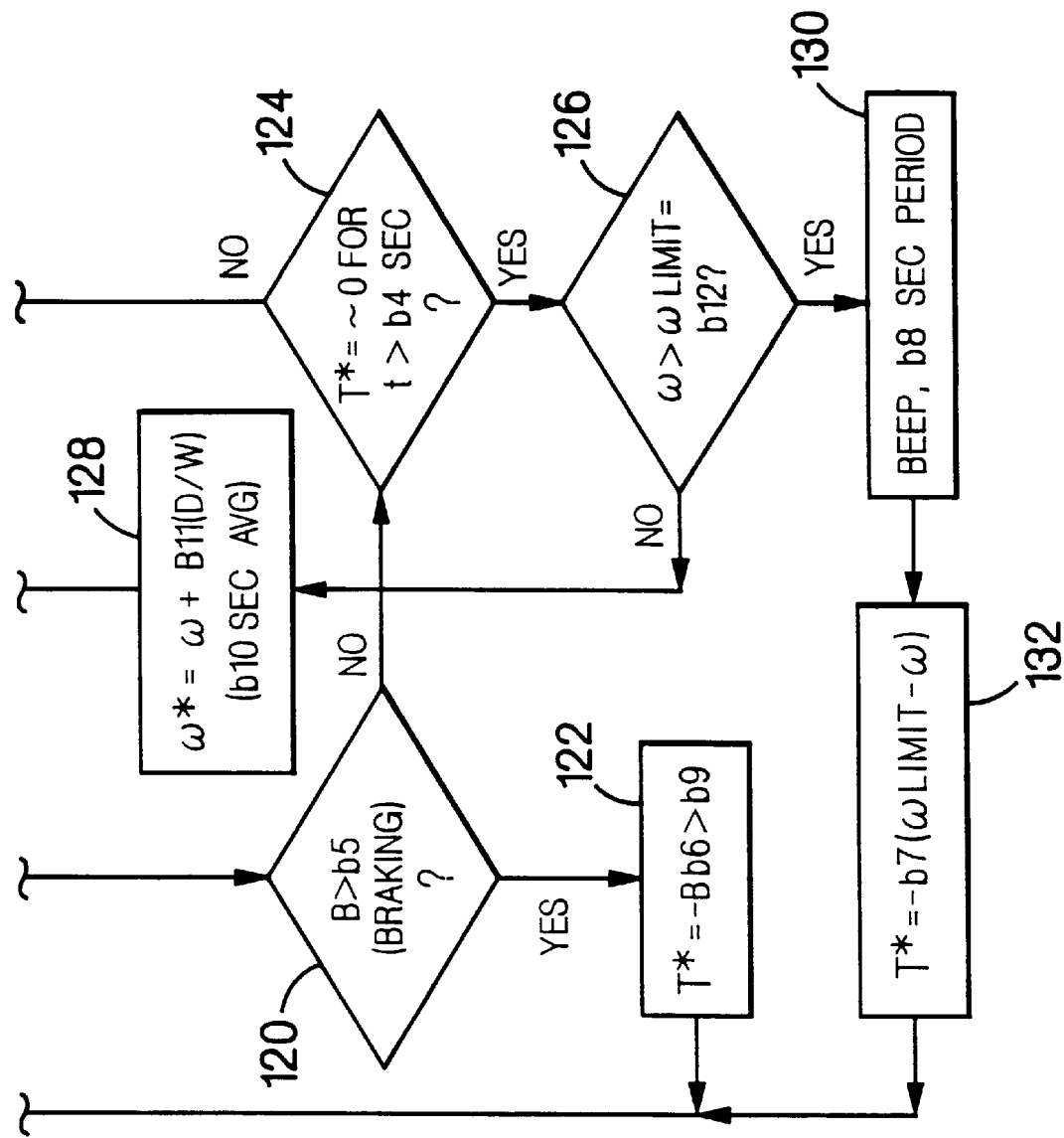

The position of mode switch 93 is received by upper level control mechanism 92. Referring to FIG. 4, upper level control mechanism 92 periodically determines (step 100) if switch 93 has been moved into positions corresponding to Modes 2, 3, 4, 5, or 6 (that is, switched out of Mode 1). If not, then upper level control mechanism 92 remains in an off state (step 102). In the off state 102 only negligible power is consumed to maintain the clock 60b (FIG. 2), and RAM 64 and SRAM 66 within memory 61 of computer 60. When switch 93 is moved to positions corresponding to Modes 2, 3, 4, 5, or 6 upper control mechanism 92 first establishes (step 104) Mode 1 parameters, including setting the brakes and setting the target angular velocity ω* of the motor to zero or to a maximum value near zero, to prevent the roller skate from rolling until signaled by the user. The mechanical wheel lock 95 (FIG. 1c) discussed above is linked to mode switch 93 so that when switch 93 is moved from the off state to Modes 2, 3, 4, 5, or 6, locking wires 95a are extracted from the wheels 12a, 12b, and 12d, allowing them to freely rotate.

Upper level control mechanism 92 then determines if the user has exited Mode 1 (step 106) by executing a prescribed sequence of motions detected by lower level control mechanism 90 (FIG. 3). For example, the user might be required to unweight the skate for a period between one and three seconds, followed within two seconds by a forceful attempt to move the skate backward and then forward while contacting the ground with significant weight. The lower level control mechanism detects an unweighted state through signals from weight distribution sensors 54, 56 (FIG. 1a) or by the loss of any road resistance (detected by computerized attempts to perturb the motor shaft angle, since if the wheel is lifted, very little torque is required to rotate the wheels). The forced backward and forward motion is detected, for example, by virtue of the voltages induced on the motor windings or by changes in a shaft encoder 160 (FIG. 5), described below.

When upper level control mechanism 92 detects the Mode 1 exit sequence, it sets (step 108) vector parameters $b_i$ (i=1, 2, . . . , $b_{max}$) to predetermined values that correspond to the position of mode switch 93 (Mode 2, 3, 4, 5, or 6). Upper level control mechanism 92 then tests (step 110) for road contact, either by detecting an unweighted skate or by periodically testing the road resistance $Z_m$ using small computer-driven perturbations to motor shaft encoder 160 (FIG. 5). The unweighted or wheels-free state is presumed when $Z_m$ is less than a threshold $b_2$, which is nearly zero. If the skate is determined to be unweighted, then motor angular velocity ω is compared (step 112) to a threshold $b_3$, which also is approximately zero. If the motor angular velocity ω is less than $b_3$, then upper level control mechanism 90 determines (step 114) if the duration of the unweighted zero-velocity state is greater than the threshold $b_1$, for example, 2 seconds. If the duration is greater than $b_1$ then upper level control mechanism 92 returns (through step 104) to determining if the exit Mode 1 sequence has been detected (step 106).

Hence, to lock the brakes and enter Mode 1 the user can stop and raise each skate in turn for two seconds. Upper level control mechanism 92 notifies the user of a return to Mode 1 with an acoustic beep from an acoustic beeper in user indicators 82 (FIG. 3). Note that a moving skater typically maintains a non-zero angular velocity, ω, so that merely removing the skate from the road does not trigger a return to Mode 1.

If motor angular velocity, ω, is found to be larger than $b_3$ (step 112), then upper level control mechanism 92 sets (step 118) the target motor angular velocity, ω*, to the existing motor angular velocity, ω, so the wheels spin freely at constant velocity. If upper level control mechanism 92 determines (step 110) that the roller skate is loaded (that is, $Z_m > b_2$), then upper level control mechanism 92 determines (step 120) if heel brake sensor 50 (FIG. 1*a*) or rearward weight distribution sensor 56 is indicating a braking request (that is, $B > b_5$). Here the braking request B might be, for example, the sum of the pressure registered by sensor 50 above some threshold, plus the pressure registered by sensor 56 above some other threshold. If $B > b_5$, then upper level control mechanism 92 sends (step 122) a target torque, T*, having a value of $-Bb_6$ to lower level control mechanism 90 to initiate braking. The maximum braking torque is $-b_9$. If no braking requests are detected (step 120), then upper level control mechanism 92 determines (step 124) if the target torque, T*, has approximated zero for more than $b_4$ seconds, for example, 0.2 seconds, the time required for the wheels on a newly planted skate to spin up to the user's chosen skate velocity. If the requisite $b_4$ seconds have passed with target torque, T* approximately equal to zero, then upper level control mechanism 92 compares (step 126) motor angular velocity, ω, to a speed limit ωLIMIT, defined by $b_{12}$. If that limit is not exceeded, then upper level control mechanism 92 sets (step 128, the major speed setting step) the target motor angular velocity, ω*, in accordance with one of the directed power Modes 4, 5, or 6. Where Mode 4 is selected, the target angular velocity, ω*, equals the current velocity, ω, plus a constant $b_{11}$ times the ratio (D/W) of the weighted difference, $D = b_{21} W_f - W_r$, between the weight ($W_f$) on forward weight distribution sensor 54 (FIG. 1*a*) and the weight ($W_r$) on rearward weight distribution sensor 56, to the total weight $W = W_f + W_r$. The variables ω, D, and W are averages of $b_{10}$ seconds of data, so as to reduce the effects of noise in these determinations. In the absence of $b_{10}$ seconds of data, the ratio D/W is replaced by zero in step 128. These $b_{10}$-second averages are understood to be arithmetic averages or median values or related measures. The target motor angular velocity, ω*, is not allowed to reach the speed limit (ωLIMIT) but closely approaches the speed limit. In Mode 3 the constant $b_{11}$ equals zero, and in Mode 4 the constant $b_{11}$ is defined to permit continued acceleration at a reasonable rate until the speed limit is reached, or to permit steady deceleration until the skate stops, all in proportion to D/W.

In a first alternative embodiment, encompassing Modes 1, 2, 3, 4, 5, and 6, the variables computed in step 128 become:

$$\omega^* = b_{11}(D/W) + b_{14}(b_{15} - U) + b_{16}(d - b_{17})$$

and $$(\delta\omega/\delta t)^* = b_{18}(D/W) + b_{19}(b_{15} - U) + b_{20}(d - b_{17}),$$

where U is the angle between the user's foot and lower leg (FIG. 1*a*), and d is the distance by which the user's right foot is placed on the ground in front of the user's left foot in the direction of travel (or vice-versa for left-footed users). The constant $b_{15}$ is the nominal comfortable resting angle U for the user, and the constant $b_{17}$ is the nominal comfortable resting value for d. In pure Mode 3, the constants $b_{11}$, $b_{14}$, $b_{16}$, $b_{18}$, $b_{19}$, and $b_{20}$ are zero. In pure Mode 4, the same constants are zero with the exceptions of $b_{11}$, and $b_{18}$, while in pure Mode 5, the same constants are zero with the exceptions of $b_{14}$ and $b_{19}$. In pure Mode 6, the same constants are zero with the exceptions of $b_{16}$ and $b_{20}$.

In a second alternative embodiment, also encompassing Modes 1, 2, 3, 4, 5, and 6, the variables computed in step 128 become:

$$\omega^* = b_{11} f_1(D/W) + b_{14} f_2(b_{15} - U) + b_{16} f_3(d - b_{17})$$

and $$(\delta\omega/\delta t)^* = b_{18} f_4(D/W) + b_{19} f_5(b_{15} - U) + b_{20} f_6(d - b_{17}),$$

where $f_i(x)$ is a function of the variable x, typically a monotonic function, and where functions $f_4(x)$, $f_5(x)$, and $f_6(x)$ typically have a dead band in the center of the range of the variable x; the value of the function in the dead band being approximately zero.

In a third alternative embodiment, also encompassing Modes 1, 2, 3, 4, 5, and 6, the six functions $f_i$, i=1, ..., 6 further include in their arguments the velocity ω, so that stronger cues from D/W, U, and d are generally required to produce a given degree of positive acceleration at higher velocities than at lower velocities.

If the speed limit is exceeded (step 126), then upper level control mechanism 92 causes (step 130) an acoustic transducer 174 (FIG. 1*a*) within user indicators 82 to generate an acoustic beep every $b_8$ seconds to notify the user that skate velocity is above the speed limit. Upper level control mechanism 92 also sends (step 132) a target reverse torque T* value to lower level control mechanism 90 to cause the lower level control mechanism to send electrical signals to motor 32 to slow the skate in proportion to the degree to which the speed limit is exceeded. If the requisite $b_4$ seconds (step 124) have not yet elapsed before a new target motor angular velocity, ω*, can be established, then upper level control mechanism 92 (step 134) continues the target torque T* value at zero.

Upper level control mechanism 92 flows through the above described steps 104–132 in less than a few milliseconds even though the target angular velocity, ω*, and target torque, T*, are typically altered relatively infrequently, for example, at intervals of 10–200 milliseconds.

Figure 5A:
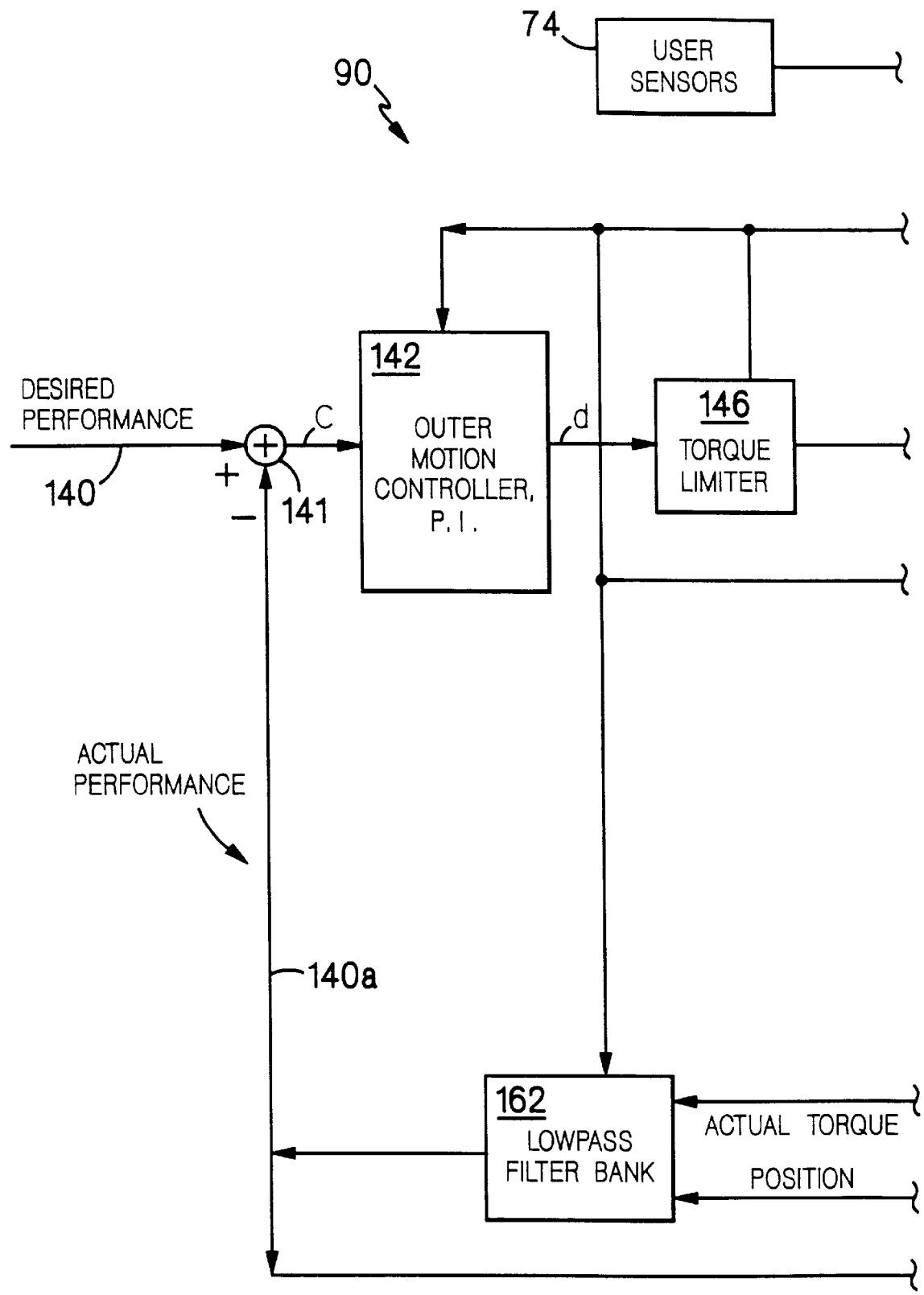
FIGS. 5a and 5b are a block diagram of the interconnections between the electrical components of the lower level control mechanism of FIG. 3.
Figure 5B:
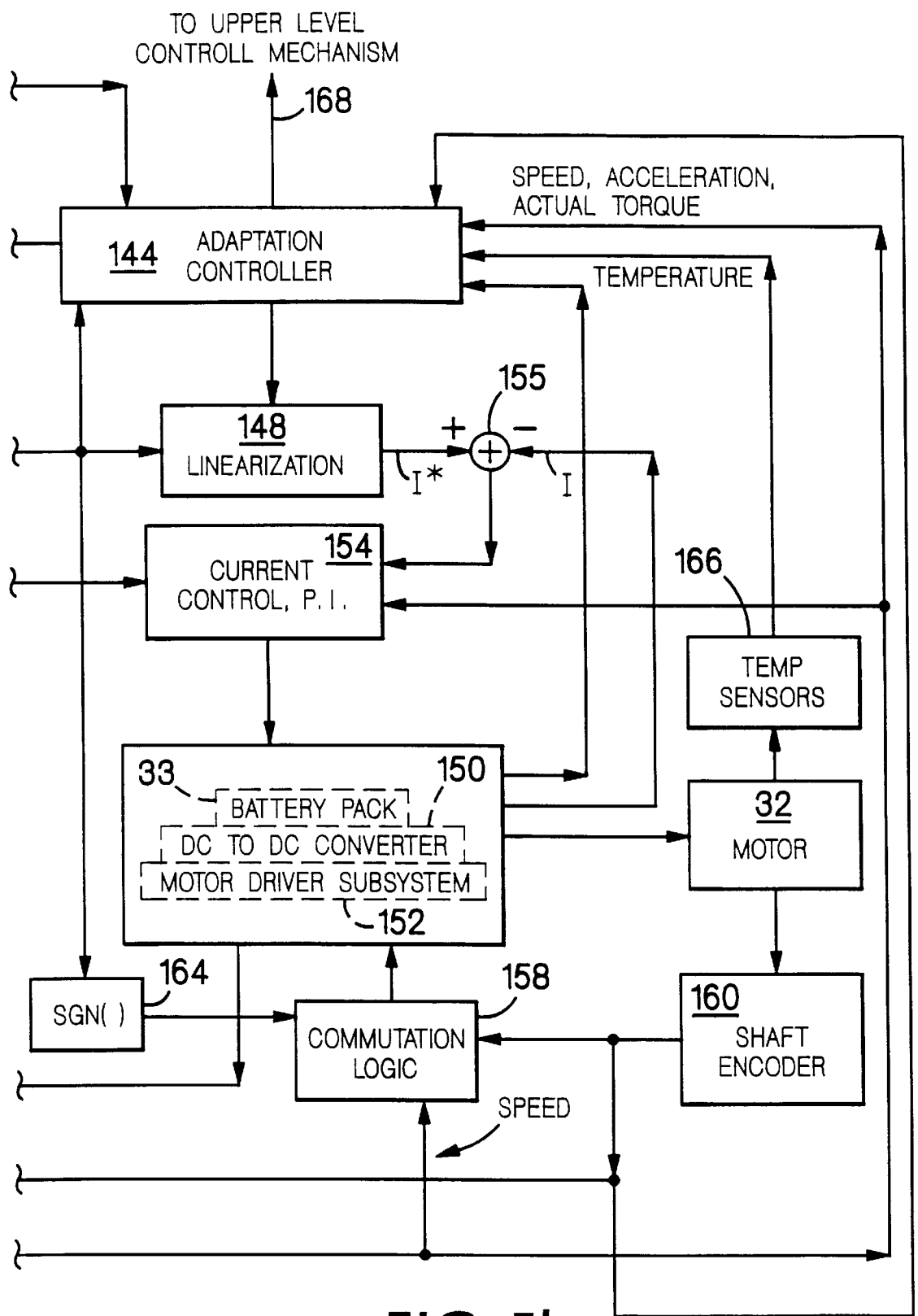

Referring to FIG. 5, lower level control mechanism 90 receives values for the desired (that is, target) angular velocity, ω*, torque, T*, and acceleration, (δω/δt)*, from upper level control mechanism 92 over lines 140, subtracts with a substractor 141 the desired values from estimates or measurements of actual angular velocity, ω, torque, T, and acceleration, (δω/δt), over lines 140*a*, and causes the motor to respond to any difference between the two sets of data to bring the actual values toward the desired values. From subtractor 141, an outer motion proportional-integral (PI) controller 142 receives a velocity error, c, equal to the difference between the desired and the actual motor angular velocity; or a linear combination of motor angular velocity and acceleration. Outer motion PI controller 142 tracks this difference as a function of time and creates a desired torque, output, d, where $$d = K_p c + K_i [\int (c \delta t)].$$

An adaptation controller 144 provides an integrator (not shown) within the outer motion PI controller 142 with a constant $K_p$, which is proportional to the gain in the velocity error c, with a constant $K_i$, which is proportional to the integral of the velocity error c, and with an anti-windup limit. The anti-windup limit is a threshold, and if c exceeds this threshold, the integrator stops integrating (that is, the integrator is clamped).

The output d of outer motion PI controller 142 is passed through a torque limiter 146 which clips the torque signal when it exceeds a (reasonable) threshold set by adaptation controller 144. Adaptation controller 144 derives this threshold from the temperature and speed of the motor, as well as, the state of the charge of battery pack 33. The output of torque limiter 146 is linearized by a linearizer 148 (that is, linearizer 148 cancels any non-linearity in the relation between motor torque and current). The specific function used by the linearizer is matched to the motor and adjusted by adaptation controller 144 in response to motor variations. The adaptation controller 144 periodically adjusts linearizer 148 in accordance with motor temperature. The output of linearizer 148 is the value of the desired level of current, I*, needed by motor 32 to generate the desired torque, T*.

The actual level of current, I, available from battery pack 33, dc-to-dc converter 150, and motor driver subsystem 152 is then compared to the desired level of current, I*, by a subtractor 155, and the difference is then sent to current proportional-integral (PI) controller 154. As in the case of outer motion PI controller 142, adaptation controller 144 provides $K_p$, $K_i$, and an anti-windup limit to an integrator (not shown) within current PI controller 154. The output of current PI controller 154 is sent to and controls dc-to-dc converter 150, and, therefore, controls the current in motor driver subsystem 152, and, hence, the torque of motor 32.

Motor driver subsystem 152 is also controlled by commutation logic 158 which receives signals from shaft encoder 160, a lowpass filter bank 162, and a signum function 164. The signum function provides commutation logic 158 with information regarding the sign of the desired torque, T*, while shaft encoder 160 provides commutation logic 158 with the actual position of motor 32. Lowpass filter bank 162 provides commutation logic 158 with the actual speed of motor 32. This information allows commutation logic 158 to properly drive, using motor driver subsystem 152, the three phases of motor 32. Shaft encoder 160 also provides adaptation controller 144 and lowpass filter bank 162 with the position of motor 32. Lowpass filter bank 162 uses the position of motor 32 to estimate the speed of motor 32 and filters the position of motor 32 and the actual torque to produce smoothed estimates of the position, speed, acceleration, and torque of motor 32. The new desired performance characteristics (in other words, torque, angular velocity, and acceleration) are then subtracted in the next clock cycle, by subtractor 141, from the actual performance estimates.

Adaptation controller 144 controls the functionality of the entire lower level control mechanism 90 by taking the estimates of the actual motor torque, position, acceleration, and battery charge, as well as, the output of user sensors 74 and temperature sensors 166, and appropriately controlling torque limiter 146, linearizer 148, lowpass filter bank 162, and PI controllers 142, 154. The appropriate control of these systems adjusts the mechanism to account for motor and battery variations due to thermal change, mechanical load, and manufacturing variations. The adaptation controller implements both the speed limit and the change in skating modes. Adaptation controller 144 also adjusts the other controllers using, for example, gain scheduling for a given set of estimated motor, battery, and load parameters. Additionally, adaptation controller 144 sends the actual motor torque, acceleration, and velocity data to upper level control mechanism through lines 168.

Figure 6:
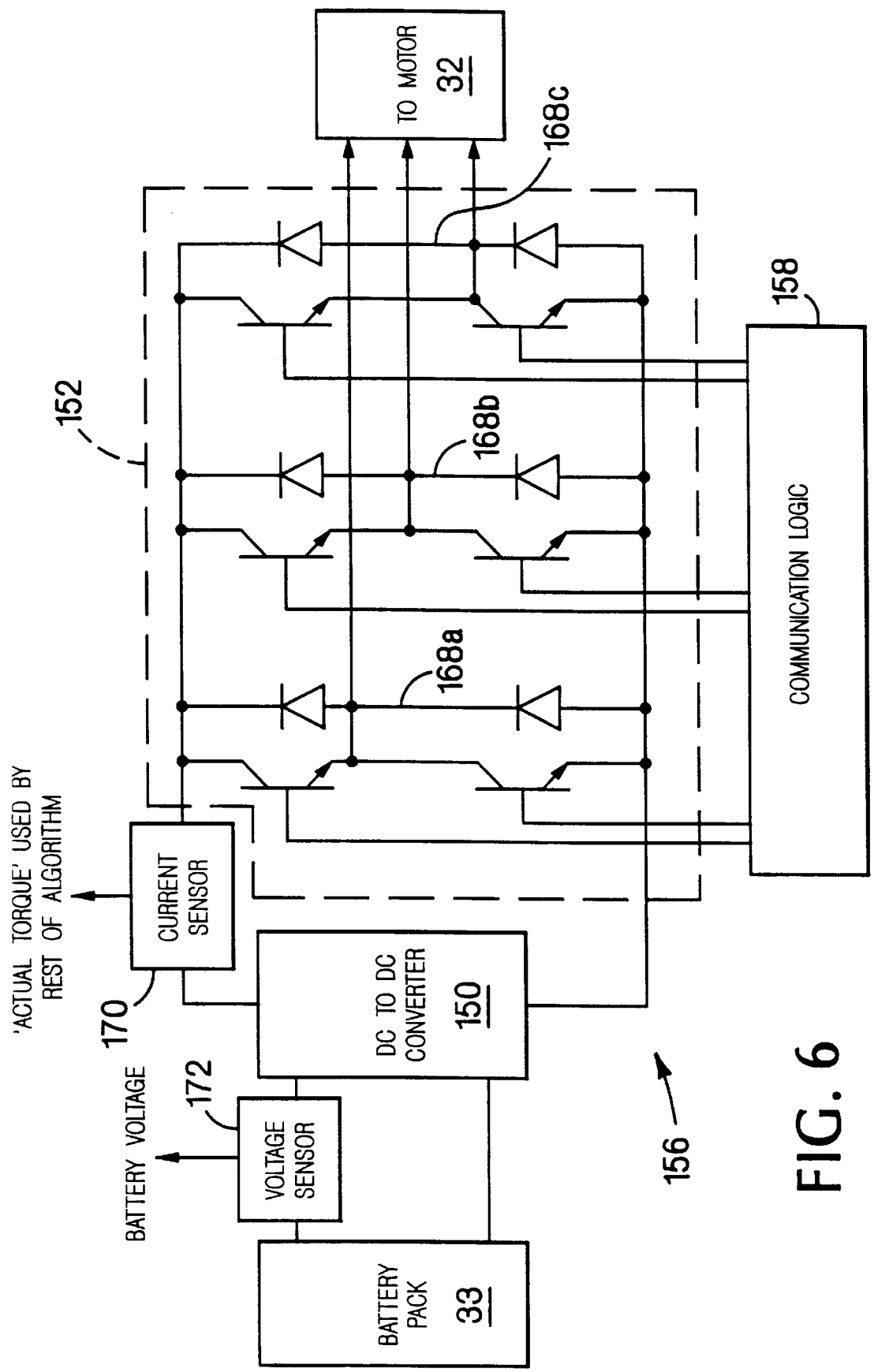
FIG. 6 is a more detailed block diagram of the interconnections between the battery pack, dc-to-dc converter, and motor driver subsystem of FIG. 5.

Referring to FIG. 6, battery pack 33 provides the power to drive motor 32 through dc-to-dc converter 150, for example, a voltage to current converter. Through appropriate manipulation of the current conversion ratio by the adaptation controller, dc-to-dc converter 150 controls the amount of current passing through drive circuits 168a, 168b, and 168c in motor driver subsystem 152. Current sensor 170 provides lower level control mechanism 90 with an estimate of motor torque by providing an estimate of the current passing through the motor. Since torque is equal to $K_{torque}I$, where I is the current delivered to the motor through the current sensor and $K_{torque}$ is a known constant generally dependent upon motor temperature, this measurement provides an accurate estimate of motor torque, T. In addition, since the conversion ratio used by dc-to-dc converter 150 in any cycle is known, this measurement of current sensor 170 also provides adaptation controller 144 with an accurate estimate of the current available from battery pack 33. Voltage sensor 172 provides adaptation controller 144 with a direct measurement of battery pack 33 voltage.

To operate brushless, permanent magnet motor 32, drive circuits 168a, 168b, and 168c send electric pulses to motor 32 which are synchronous to the position (that is, timing) of motor 32. As described above, the position is determined by shaft encoder 160 (FIG. 5) and using this information commutation logic 158 drives drive circuits 168a, 168b, and 168c to provide accurately timed electric pulses to motor 32. In-depth discussions on the proper operation of motors can be found in W. Leonhard's *Control of Electrical Drives* (Springer-Verlag 1985, Berlin, Germany) and B. K. Bose's *Power Electronics and AC Drives* (Prentice Hall 1986, Englewood Cliffs, N.J.), which are incorporated herein, in their entirety, by reference.

Temperature sensors 166 (FIG. 5) include a motor temperature sensor, a power electronics temperature sensor, a battery pack temperature sensor, and an outside (that is, environmental) temperature sensor. If the motor, the power electronics, or the battery pack become too hot, they can become damaged and fail. Similarly, the motor can fail if the permanent magnets are too cold. The adaptation controller notifies upper level control mechanism 92 of impending failure conditions, such as rising or falling temperatures, and upper level control mechanism notifies the user through user indicators 82.

An important feature of roller skate 10 (FIG. 1a) is the acceleration and braking of the skate in a user-responsive hands-off manner through computer-control of motor 32 using real-time data from sensors. The user's weight and weight distribution on the skate, in combination with skate orientation, history, and real-time motor speed, torque, and acceleration, largely determine proportional skate acceleration and braking.

Above, six control modes were identified. In Mode 1, the wheels are locked mechanically or by motor control and the user can walk normally. In Mode 2, controller 44 causes motor 32 to drive the wheels with a torque equal to the motor resistance to compensate for motor friction, where motor resistance equals the amount of torque required to turn the wheels when the skate is lifted from the road surface. Also in Mode 2, controller 44 can protect against unintended backwards motion by having the motor apply a forward torque to the rear wheels to counter any reverse torque or by providing a mechanical ratchet action. In this variant of Mode 2, the user alternately rolls each skate into the forward position with only the rear skate ratcheted, through motor control. This mode can also be combined with various braking options.

In Mode 3, the principal signals controlling skate acceleration and deceleration are derived from motor velocity, torque, and load. These signals are then interpreted in conjunction with the recent history of the user's weight distribution on the foot support as determined by weight distribution sensors 54, 56 (FIG. 1a), and possibly leg angle as determined by force gauge 57. There are many variations of the preferred embodiment, several of which are described below.

One preferred embodiment of Mode 3 generally sets motor torque to maintain the skate velocity established when the skate last was set down on the pavement, an event evident from the sudden transition from an unweighted state to one of significant weight being placed on the skate. For users who shuffle forward without fully removing their weight from any skate, the threshold for weight removal is correspondingly shifted upward by the computer toward the maximum weight limit. The user's weight is determined by recent weight data, where the minimum and maximum of smoothed data from the weight distribution sensors are used to refine limits (zero and maximum weight) determined over a longer period of time.

Upper level control mechanism 92 (FIG. 3) sets the target motor angular velocity, $\omega^*$, of the skate equal to the estimated actual velocity, $\omega$, observed during the previous torqueless phase t=0.2 seconds after the observed skate loading, W, exceeds 0.2 times the user's maximum skate weight $W_{max}$. The torque-less phase is initiated whenever W falls below 0.1 times $W_{max}$ for more than t=0.2 seconds. Values of the parameters $T^*$, $W_{max}$, and t are varied to provide the most natural and desired user response characteristics. Skate loading W is determined by weight distribution sensors 54, 56 (FIG. 1a) and/or force gauge 57. Another embodiment of controller 44 initiates and terminates the torque-less phase based not upon skate loading W, but upon road torque observed when the motor is dithered about a level and at a high frequency imperceptible to the user; detected road contact is approximately equivalent to observing values of W above 0.2 times $W_{max}$ in the first preferred embodiment.

To help protect skaters from falls in Mode 3, skate velocity is diminished by proportional electronic braking when the user's relative weight distribution on the forward or rearward portion of the skate drops below a first threshold or rises above a second threshold, respectively, or if interskate communication system 84 (FIG. 3) indicates that the other skate is braking, or a leg angle sensor detects an above-threshold obtuse angle between the user's lower leg and the attached foot, or a range sensor 171 (FIG. 1a) indicates that the skate is a distance in front of the other skate and the distance is above a third threshold, or if an orientation sensor 173 (FIG. 1a), for example a mercury switch, indicates that the skate has shifted beyond a fourth threshold. Braking arises either from reverse torque applied to at least one of the wheels of the skate by the motor or from pressure applied to the wheels by disk brakes or similar means. Additionally, the interskate communication systems can communicate the velocity and torque of any braking skate to the other skate and, thus, enable the controllers 44 of both skates to match the rolling velocity of both skates while permitting the user to use force to modulate the separation between the two skates as desired.

A range or relative position sensor 171 (FIG. 1a) measures the relative positions of the two skates, for example, by measuring the near fields of one or more magnets or electric antennas on the other skate to determine the range of the other skate relative to the "measuring" skate. Near fields include either their absolute field values or, for example, the distance- and angle-dependent ratio between their dipole and quadrapole fields (or higher multi-pole terms), where each field term is excited with a distinct waveform.

Mode 3 permits users to maintain their skating speed and even accelerate naturally without swinging their legs to the side. Avoiding the need for lateral skate movement is a significant safety feature in crowded environments. That is, the rearward skate generally maintains speed, permitting the skater to accelerate or decelerate by controlling the velocity of the stepping or forward skate when the skate is set down on the road. For example, to decelerate slowly the skater can slowly walk or shuffle backwards relative to the forward motion, until the cumulative effect is to bring the skater to a halt. The skate's power rating, or the ability of the rearward skate to maintain speed when the skater exerts a backwards thrust on it, will limit in part the skater's top speed and acceleration available without lateral skate motion.

To prevent small triggering motions from spontaneously accelerating resting skates (in other words, the user is standing still), the skates can be automatically braked whenever the skater stops moving for more than a predetermined time, such as three seconds. Restarting and releasing the locked wheels can be initiated by a variety of skate commands, such as lifting one skate to the rear by bending one's knee some predetermined amount such as 90 degrees, (detected by orientation sensor 173, FIG. 1a) before swinging that skate naturally forward to take the first step. After the first step the skater might coast forward on the new supporting leg before taking a second step forward with the trailing foot, which would generally be unweighted and then placed down on the road before its motor also begins rolling its wheels forward to keep up with other skate. Once both skates are moving at the same speed the skater can simply coast at roughly constant speed or change speed and direction by stepping forward or backward appropriately, or by engaging skid or other brakes as suggested above. In effect, Mode 3 resembles walking on a moving beltway, the speed of which is controlled primarily by the average skate speed when the user's weight is first placed upon the skate after the weight on the skate was zero (that is, unweighted; the skate was lifted).

In its simplest form, acceleration for Mode 4 increases partly in proportion to the percentage of the weight placed forward on the skate, and deceleration begins when the weight distribution shifts backward. As a result the user can move forward in several modes. For example, Mode 3 behavior is obtained in Mode 4 simply by maintaining nearly uniform weighting fore and aft on the skates when stepping forward. Hence, Mode 3 behavior can be overlaid on Mode 3 behavior, by a user who deliberately controls his or her weight distribution while in Mode 4. Alternatively, Mode 4 acceleration can be determined by weight distributions alone and not by the velocity established when an unweighted skate is set down, thus, precluding simultaneous Mode 3 and Mode 4 response characteristics. Other mixes of Mode 3 and Mode 4 behavior are possible. In effect Mode 4 resembles standing, walking, or shuffling on a moving beltway, the velocity or acceleration (or some combination thereof) of which is controlled primarily by the average forward centering of the user's weight on the skates. Similar to Mode 3, Mode 4 permits users to maintain their skating speed and even accelerate naturally without swinging their legs to the side, avoiding the need for lateral skate movement. One variant of Modes 3 and 4 requires only one powered skate, the other simply being of low friction design and optionally incorporating brakes triggered by that skate or by signals from the other skate.

A user in Mode 4 moves forward, with feet parallel and spaced apart to provide the desired degree of lateral balance, by leaning forward and backward to signal the desired degree of acceleration (or velocity or combination of velocity and acceleration, as indicated by the chosen values of the constants $a_2$, $a_3$, $b_{11}$, and $b_{18}$) and braking, respectively. Controller 44 (FIG. 1a) can control motor 32 in response to various combinations of total weight on the skate, weight distribution, and recent skate velocity and torque history to permit the skates to balance the user as an inverted pendulum on short time scales (fractions of a second), while still permitting the user to shift his or her weight to control average speed or acceleration on slightly longer time scales of a second or more. The degree to which user balance impacts user response characteristics is a matter of user choice, as is the speed limit for maximum rolling speed and maximum skater speed, where the latter is greater if the skater provides additional power beyond what the motor provides.

The forward skate normally has more weight on its heel than the rearward skate, and, thus, acceleration in Mode 4 tends to restore the two skates to a side-by-side configuration. This tendency can be overcome, if desired, by the user's manipulation of foot and leg muscles.

Mode 4 is supplemented by communication between the skates and by measurements of skate separation. In particular, braking provides motor forces that tend to inhibit further skate separation.

Figure 7:
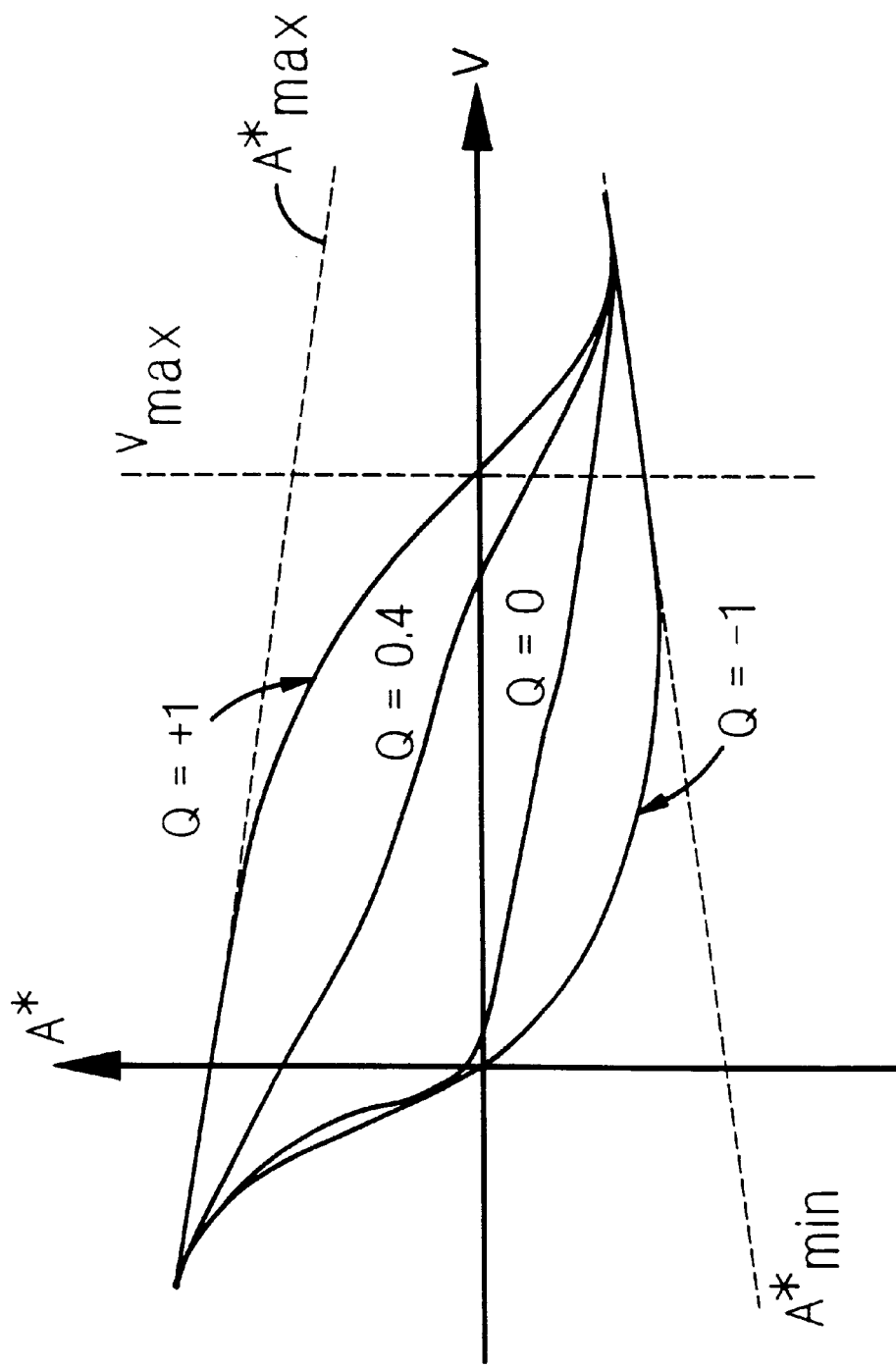
FIG. 7 is a graph representing an operational skate mode 4 control law.

Referring to FIG. 7, to characterize a particular Mode 4 control law (for example, a polynomial, piece-wise linear equation, or table look-up executed by controller 44, FIG. 3), a graph is used to relate the desired acceleration, $A^*$, (sent from upper level control mechanism 92 (FIG. 3) to lower level control mechanism 90) to the actual estimated skate velocity, v, with a chosen "weight-forward" metric Q. As one example, Q=(F−R)/(F+R), where F is the weight on forward weight distribution sensor 54 (FIG. 1a) and R is the weight on rearward weight distribution sensor 56. Hence, Q generally lies between the values of +1 and −1, assuming F and R are always positive. As shown, for any particular value of Q, the maximum allowed acceleration $A^*_{max}$ diminishes slightly with increasing velocity v to a minimum allowed negative acceleration $A^*_{min}$. Safety generally requires a decrease in the allowable acceleration as the skate velocity increases, and equipment considerations generally require a decrease in the allowable acceleration and motor current as the temperature of the motor or power electronics increases.

When the user's weight is maximally forward and Q=1, the maximum forward safe acceleration is possible if the skate velocity is negative. As the velocity increases to the speed limit $v_{max}$, however, the allowable acceleration diminishes to zero. For velocities beyond this speed limit, upper level control mechanism 92 sends lower level control mechanism 90 a negative acceleration command which causes motor 32 to apply reverse torque to the skate's rear axle to slow or brake the rear wheels. Similarly, if the skate is forced backward so that velocity, v, is negative, then forward acceleration results which again brakes the skate. The control law can be modified to reflect the skill of the user or road condition (typically $v_{max}$, $A^*_{min}$, and $A^*_{max}$ are varied). For example, $v_{max}$ might be temporarily reduced if the torque history of the motor is excessively erratic, indicating a poor road surface or unstable user, and $A^*_{max}$ might be temporarily reduced if the velocity of torque history of the motor becomes unusually erratic following larger accelerations. In addition, depending on a user's skill or preferences, when the skates are stationary or moving at slow speeds, more forward weight might be required to move or accelerate them, to help avoid accidents from unexpected or unnoticed forward motion. This can be accomplished by a non-linear relationship between Q, for example, and $A^*$ where the relation has a dead-band in the middle of its range where $A^*$ is nearly zero; more erratic skating could be followed by an expansion of this dead-band.

The maximum allowed velocity $v_{max}$ may also be made dependant upon the total weight W, where $v_{max}$ goes to zero if W is below some minimum threshold corresponding to an unloaded skate or to a child too small to use the device safely. Similarly, if W exceeds a maximum threshold, for example, 250 pounds, $v_{max}$ can be set to zero, for example, to avoid overloading the motor. To smooth the transitions to braking, $v_{max}$ is made a gradual function of W and involves sampling W over time so that only sustained weight improprieties induce stopping. Optionally, the speed limit $v_{max}$ is reduced when making turns, particularly sharp turns. The degree of a turn can be detected by a sensor on a steering mechanism, described below, or by an accelerometer.

In Mode 5, Q (that is, (F−R)/(F+R); the degree of forward weight distribution) is replaced by the angle U (FIG. 1a), measured in radians, between the user's foot (not shown) and lower leg (not shown). This angle typically becomes more acute (diminishes) as the user's knee bends and as the user leans forward from the ankle. A decrease in the angle U is used in Mode 5 as an indication that the user wishes to skate faster, while an increase in the angle U serves as an indication that the user wishes to slow down. Hence, U is used as a signal of the user's intentions instead of Q (Mode 4). As in the case of Q for Mode 4, U may be used to control primarily the target velocity or the target acceleration, or some combination thereof. Increasing values of Q diminish U only when the user leans forward from the ankles or bends the knees. Increasing Q by leaning forward from the waist or by extending the arms forward will not diminish U (that is, will not cause the controller to increase the skate velocity). For example, Mode 5 is exercised when the user crouches or stands straight, which, without a change in weight distribution, will not change Q. Mode 5 may be preferred to Mode 4 by users afraid of losing their balance by leaning forward or aft to change skate speed.

A combination of Mode 4 and Mode 5 is achieved by replacing Q in Mode 4 by S, which is a monotonic linear or nonlinear function of Q and U, for example:

$$S = 0.1Q - 2U + N_p.$$

$N_p$ is approximately equal to $\pi$ radians and indicates the "neutral point" of U, that is, $N_p$ indicates the point at which the user is standing erect (U equals approximately 90° or $\pi/2$ radians when the user is standing erect). At the neutral point, the controller maintains the current skate velocity. If Q is ignored in the above equation for S, then the hybrid control law represents pure Mode 5.

In Mode 6, a user's relative foot position is used to signal a user's skating intentions instead of the user's weight distribution (Q, Mode 4). Relative foot position refers to the distance, d (typically measured in meters), by which the user's right foot is placed in front of the user's left foot (or vice-versa for left-footed users). As d increases beyond a predetermined threshold, for example, 25 cm, the controller causes the motor to accelerate the skate. Conversely, as d drops below another predetermined threshold, for instance, negative 25 cm (that is, the left foot is in front of the right foot), the controller causes the motor to apply a reverse torque to brake the skate. The degree of acceleration and braking increases until the foot separation reaches a predetermined limit consistent with user balance and motor capability. Alternatively, the distance parameter d can be a combination of foot separation, in the direction of motion and laterally thereto. The acceleration and braking can be applied to the two skates in any desired proportion.

One method of measuring foot separation requires one skate to radiate near-field AC magnetic radiation and the other skate to receive the radiated near-field AC magnetic radiation. The received radiation is measured at the front and rear of the receiving skate using, for example, small coils (that is, loop antennas). The magnetic strength in the near field of a magnetic dipole radiator decays roughly as the third power of distance, so for the short distances expected here, the strength of the radiation received at the front of a single skate may differ from that received at the rear of the same skate by an easily measurable ratio of 10 or more. The absolute strength of the received radiation varies by even larger ratios as the skates separate to one meter or more. The signed distance d is deduced from a combination of the strengths of the radiation received at the front and rear of the skate. The control law is made robust against the magnetic perturbations encountered as the user skates over thick metallic plates or grates, for example, by monitoring the antenna loop inductance and using alternate control modes when the inductance is excessively perturbed. Acoustic, optical, or near-field electric signals can also be used instead of magnetic radiation for estimating d.

Seamless transition between all six modes can be obtained without the use of a conventional switch. For example, Mode 1 can be the default turn-on mode that is entered whenever the user stops for more than a few seconds, and Modes 2 and 3 are entered from Mode 1, only when the user lifts one foot off the road and sets it down again within, for example, 2.0–3.0 seconds. The degree to which Mode 3 assists Mode 2 behavior can be predetermined in accordance with the pre-established user's desire for exercise or by the motor's inability to provide all the power desired.

Modes 4, 5, and 6 can all operate simultaneously and be selectively emphasized by the user's chosen values of Q, U, and d, where the more extreme values of Q, U, or d dominant the less extreme values. That is, the separate control law associated with each variable has a total or partial "dead band" near its average values, and becomes active and sensitive only for a value of Q, U, or d which is sufficiently greater or less than its nominal average. For example, a user for a single fixed set of control laws can brake either by decreasing Q, or increasing U, or decreasing d to its extreme values, or by doing so for any combination of these three control variables. Partial braking or acceleration can be achieved in the same way, when the user selects which parameter or combination of parameters to set outside its dead-band range, and to what degree, all as indicated simply by the user's leg motion. The braking or acceleration implemented is computed as a linear or non-linear weighted superposition of the numerical values of the separate control laws for Q, U and d. The relative influence of each control mode can be determined by adjusting the relative sizes of the three dead bands, and the other parameters associated with each separate control law, in accord with user preferences (a separate mode-adjustment signaling means is employed for this mode definition function).

Modes 4, 5, and 6 may become operative only if the user fails to lift any skate for more than a predefined period, such as 5 seconds, while being in Modes 2 or 3. Modes 4, 5, and 6 may be exited in favor of Modes 2 and 3 upon any ensuing foot lift of duration greater than, for example, 0.3 second, or in favor of Mode 1 if the skates are stationary longer than a few seconds. Obvious variations in the suggested time intervals and control law functions will also achieve the desired objectives of user-friendly skate control through reasonably natural leg motions alone. To this combination of control modes can also be added over-riding or superimposed braking, velocity, or acceleration commands provided by a hand signaling device, skid brake sensor, or similar means. For this alternative combined-mode system, the mode switch 93 might simply become an on-off switch, or a part of the mode-adjustment signaling means.

Other Embodiments

Power Sources

Although motor 32 (FIG. 1a) was described as a battery-driven electric motor, other power sources can be used, including an internal combustion engine or an electric hybrid motor, provided the appropriate fuel supply is made available.

Power Transfer

Additionally, separate motors can be used to drive each of the wheels 12a, 12b, 12c, 12d (FIG. 1a) or to drive one forward wheel 12a, 12b and one rear wheel 12c, 12d or to drive forward axle 14 and rear axle 20. Alternatives to gears 38 and 40 (FIG. 1a) can be employed including belts or hydraulic transmissions or a differential gear box (similar to an automobile). They may have a single gear ratio or multiple gear ratios which are switched manually or electrically by command from the controller.

Location of Roller Skate Components

Instead of locating motor 32, battery-pack 33, and controller 44 under foot support 18, one or more of these components can be located elsewhere, such as above or to the side of a user's foot, or on the user, for example, the user's back or leg.

Foot Restraining Mechanisms

Figure 8:
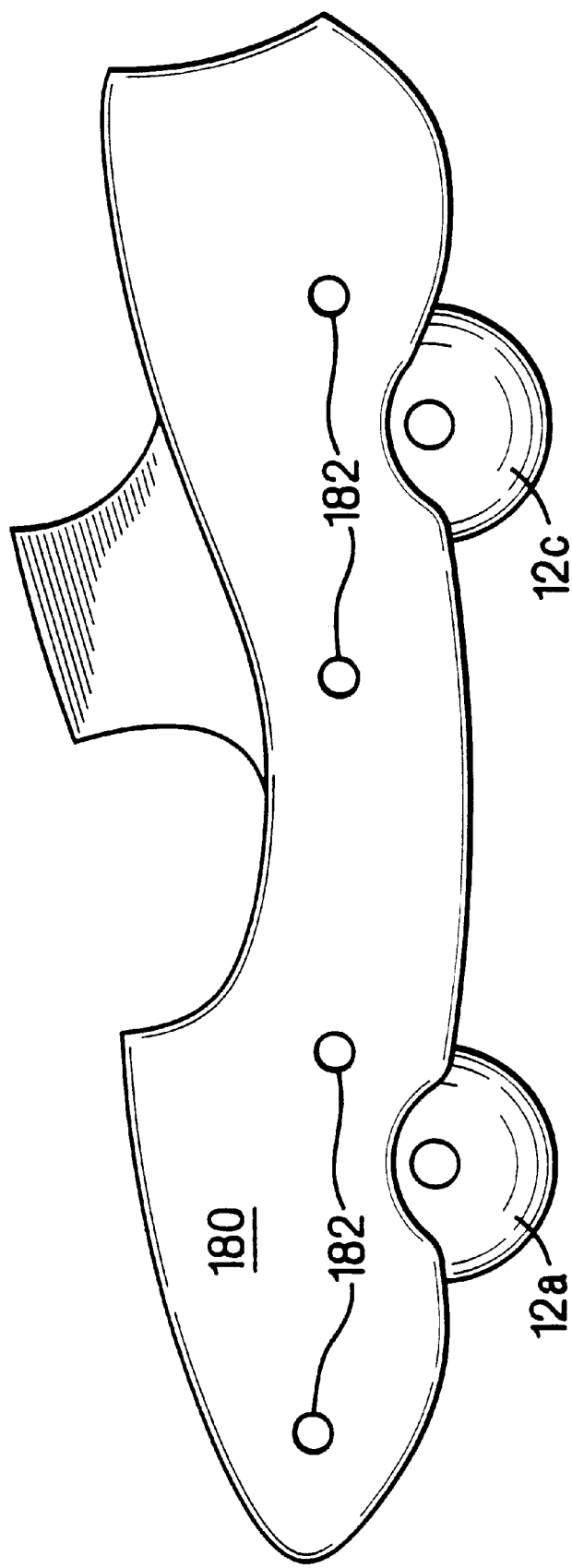
FIG. 8 is a side view of an outer skin.

Moreover, additional or different foot embracing mechanisms can be employed, including foot or ankle straps, flaps, laces, or Velcro® fasteners. Referring to FIG. 8, a user's foot can also be embraced by an outer skate skin 180 (shown in side view), in appearance much like the skin of an automobile. Skin 180 can be used to restrain the user's foot as an alternative to one or more of toe strap 26 (FIG. 1a), heel strap 28, upper foot strap 30, and ankle strap 31, or skin 180 can be used for appearance only to cover these straps. This replaceable skin provides aesthetic value along with abrasion resistance, collision protection, and splash-guard protection. Skin 180 can be attached to foot support 18 with pins (not shown) through apertures 182; many other attachment mechanisms could be used. Where skin 180 is used to restrain a user's foot in place of the above listed straps, an adjustable closing (not shown) at the rear of the skin may be provided to adjust to different foot or shoe sizes.

Foot Support

Figure 9:
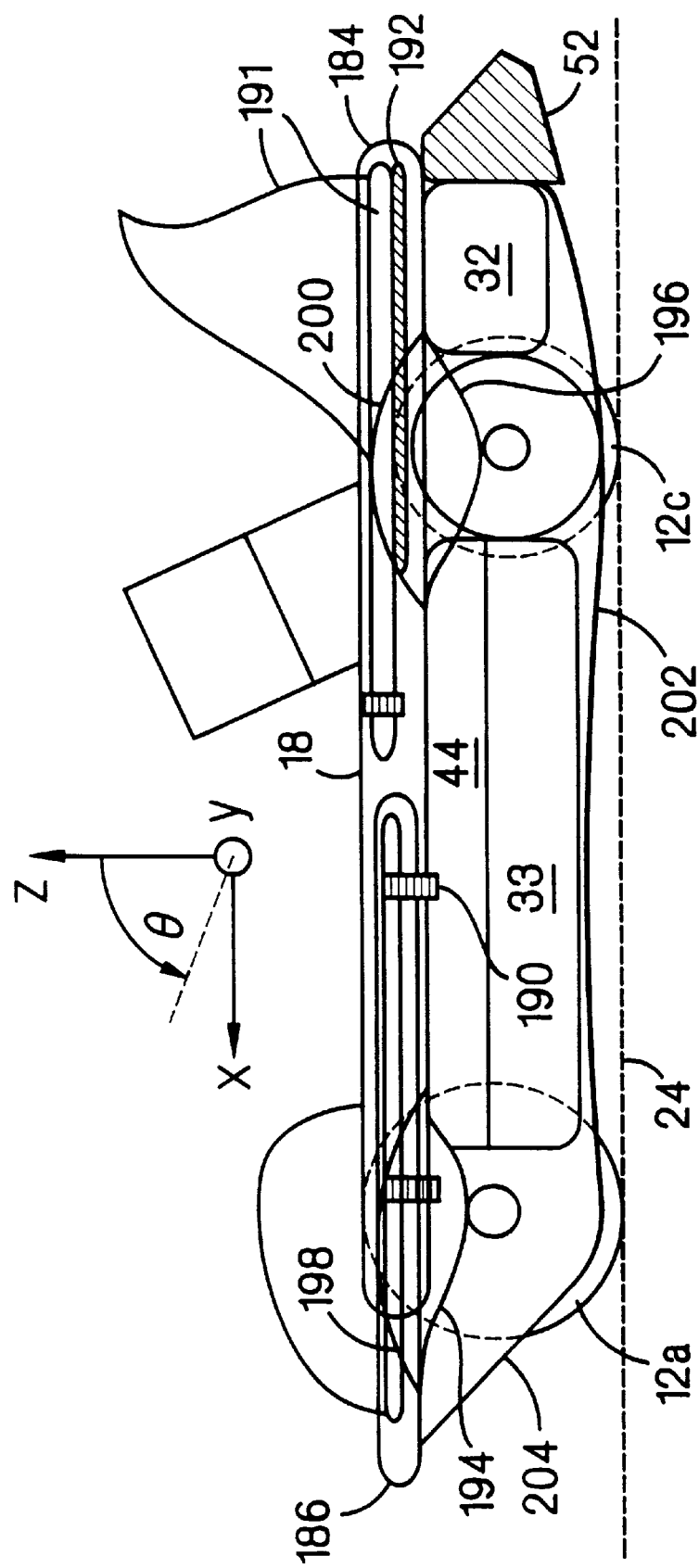
FIG. 9 is a side view of an alternate embodiment of a powered roller skate having a foot support that is adjustable to the length of a user's foot.

Referring to FIG. 9, foot support 18 includes a rearward portion 184 that is slidably disposed relative to a forward portion 186 to allow the length of the skate to be adjusted to fit different sized feet. Screws 188, 190 or similar fasteners securely attach the forward and rearward portions at an adjustable distance. Rearward portion 184 may be attached to a heel control 192 which permits rearward portion heel-embracing means 191 and, hence, the user's heel, to lift slightly away, and to an adjustable degree, from foot support 18 to facilitate forward skating with longer strides. The adjustments to heel control 192 can be implemented in many ways, including with Velcro® or adjustable springs.

Wheel Configurations

Although roller skate 10 (FIG. 1a) was described as having four wheels 12a, 12b, 12c, and 12d, different wheel configurations are possible, for example, a three wheeled configuration: one front wheel and two rear wheels; an in-line skate configuration; or one or two front wheels and one very wide (that is, about the width of the skate), centered rear wheel. Similarly, instead of mounting the wheels in a fixed position relative to the foot support, the wheels can be movably mounted. With such an arrangement, the user can move the wheels further apart for high speed skating and closer together for walking.

Suspension

Referring again to FIG. 9, spring supports and shock absorbers for each of the wheels (only spring supports 194, 196 for wheels 12a, 12c are shown) function as suspension mechanisms to reduce the amount of vibration that reaches a user's foot when the wheels roll over rough road surfaces. In combination with each spring support, indentations (only indentation 198, 200 for wheels 12a, 12c are shown) in foot support 18 are provided to allow extra clearance for the wheels as they approach the foot support.

Component Protection

A sturdy case 202 can also be used to surround motor 32, battery pack 33, controller 44, and gears 38, 40 (not shown). Case 202 both seals the devices against environmental moisture and dirt and protects the devices against impact with road hazards (that is, rocks, curbs). The front slope 204 of the bottom of the case 202 can also partially deflect the shock to the front wheels of collisions with obstacles like large cracks in the road. Placing small wheels (not shown) across this front wedge surface facilitates riding up over small obstacles without stalling motor 32. Generally, case 202 is removable to allow for periodic skate and component cleaning and lubrication.

Turning

Turning is typically accomplished while skating by successively lifting and planting one's feet, while turning them in the desired direction, in one or more steps. Alternatively, by leaning left or right a sufficient distance, front axle-support assembly 16 (FIGS. 1a and 1c) can be configured with a turning truck to respond by turning the front wheels or wheel slightly in the desired direction. Such turning trucks are widely employed on roller skates and skate boards. For safety reasons this angle is limited to small values at high speeds, for example, a few degrees. Another steering option is to configure front axle-support assembly 16 to turn the front wheels in response to a lesser torque applied in the turning direction through the user's body. These passive steering mechanisms may be supplemented or replaced by motorized steering responsive, for example, to pressure sensors 175a, 175b (FIG. 1b) which detect changes in a user's lateral weight distribution. The shape of the wheels in the transverse direction may also passively influence steering as weight is adjusted laterally; e.g., a broad round-bottomed centrally located front wheel will turn the skate in the direction of the lean. These passive and active steering controls can also cause the rear wheels to turn.

Power Output Port

In addition to the external computer I/O port 69 (FIG. 2) and recharging port 86, an additional external power output port 206 may be provided for utilizing the roller skate's ability to generate a variety of power signals to drive external equipment for possibly unrelated purposes, for example, a light 207 (FIGS. 1a–1c).

Wheel Retraction

Figure 10:
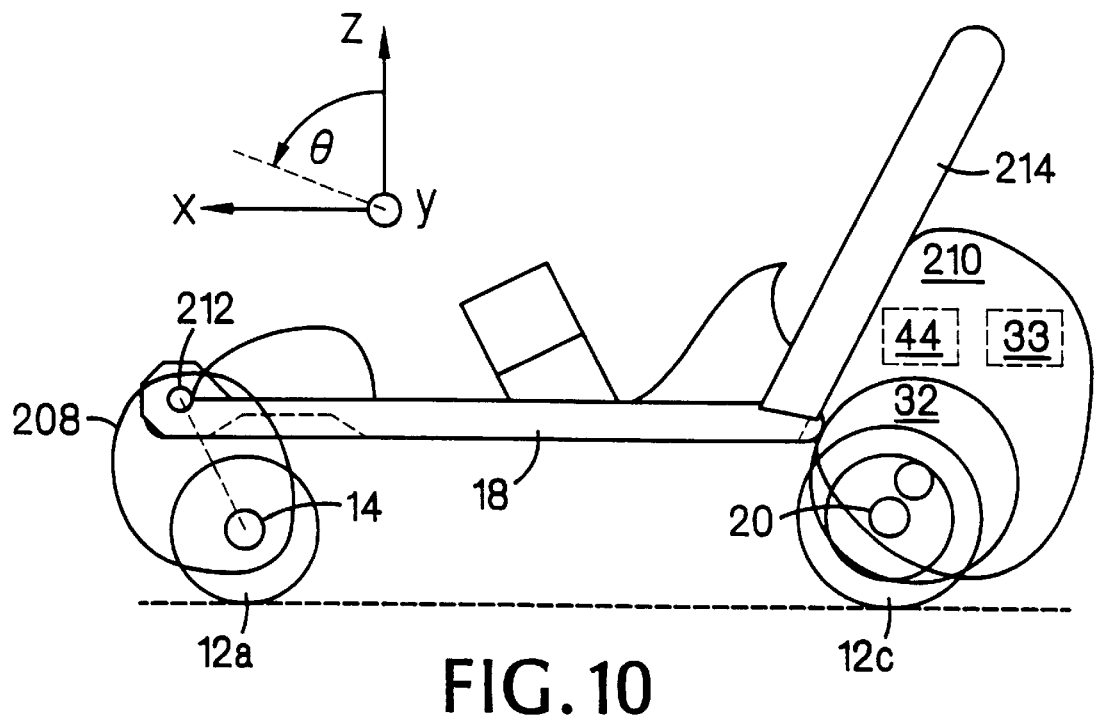
FIGS. 10–11 are side views of an alternate embodiment of a powered roller skate having wheel retraction mechanisms.
Figure 11:
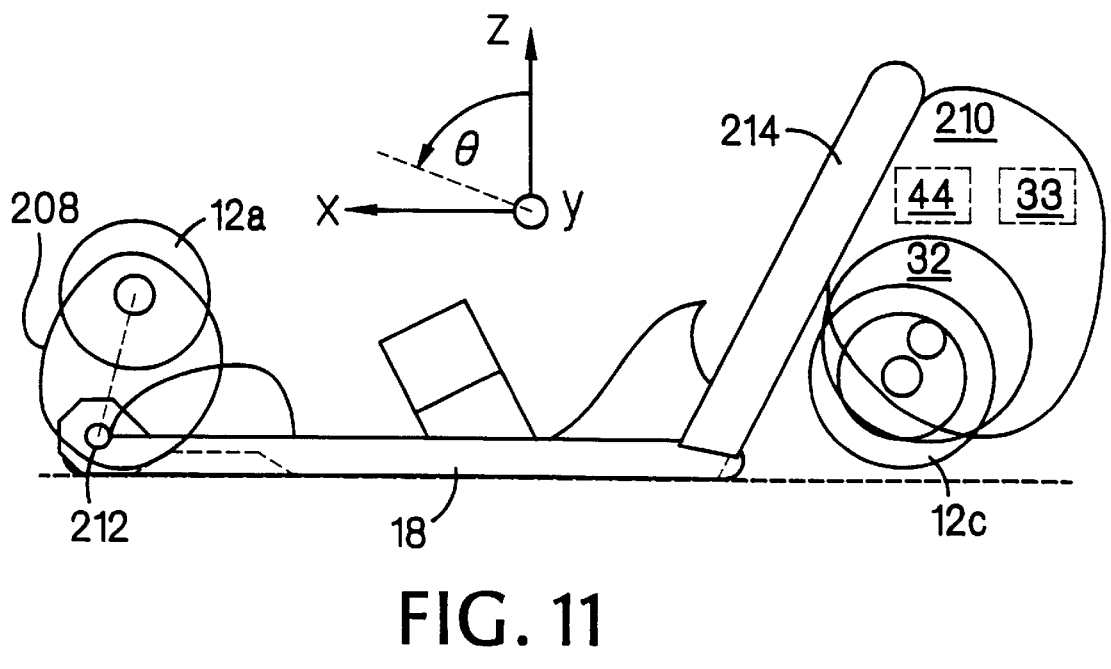

Referring to FIGS. 10 and 11, in another particular embodiment, instead of mounting wheels 12a, 12b, 12c, and 12d to foot support 18 through axle-support assemblies 16, 22 (FIG. 1a, 1c), a forward and a rearward wheel retraction mechanism 208, 210, respectively, mounted to foot support 18 can be used to support and retract the wheels above foot support 18 to allow the user to walk on foot support 18 or case 202. Forward wheel retraction mechanism 208 allows the front wheels 12a, 12b to rotate up around an axle 212, while rearward wheel retraction mechanism 210 allows the motor 32 and rear wheels to slide upward along a sliding support surface 214. Alternatively, wheel retraction mechanisms 208, 210 are four-bar linkages, axle retraction mechanisms, or sliding retraction mechanisms, or a combination thereof. For safety, the retraction mechanism must not retract accidentally while the user is in motion or unprepared. Thus, each retraction mechanism incorporates some locking mechanism that is easily released by the user but does not release accidentally. Further safety can be achieved by combining two simultaneous or sequential actions in the retraction process; for example, requiring a release lever to be pulled at the same time the front wheel is forced backward by the user, perhaps by scraping the front wheel against the user's other foot. Secure detentes or similar locking devices can hold the wheels in their retracted position until forcibly deployed. Motorized devices can also be used to retract and/or deploy the wheels.

Wheel retraction mechanisms 208, 210 may be integrated with a spring support or other suspension mechanism to reduce the amount of shock and vibration transferred to the user's foot. Additionally, retraction mechanisms 208, 210 may be integrated with a turning mechanism.

Walking

Figure 12:
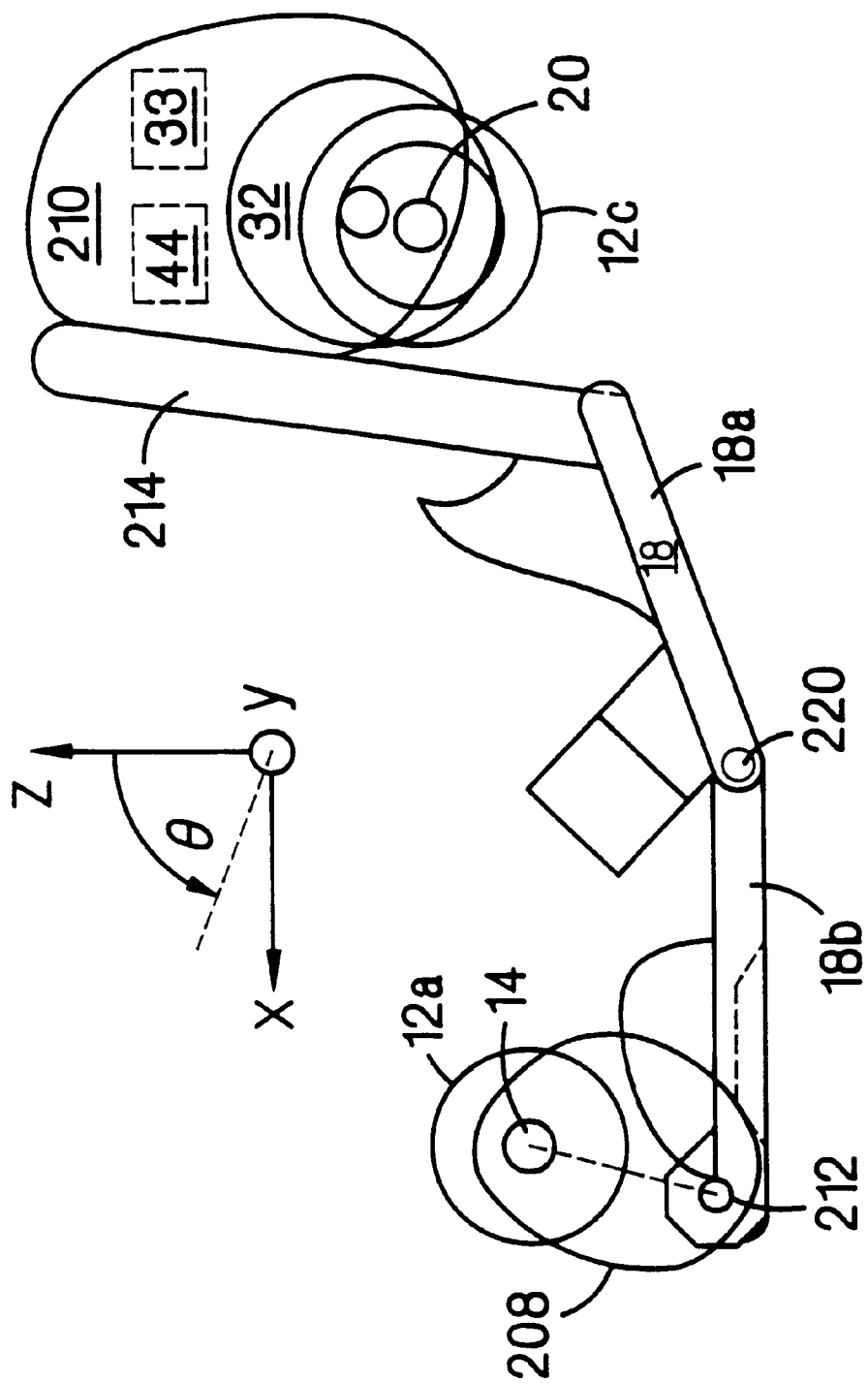
FIG. 12 is a side view of an alternate embodiment of the foot support of FIGS. 10–11.

Referring to FIG. 12, a flexible joint or hinge 220 connecting two sections 18a and 18b forming foot support 18 permits easier walking when the wheels of the roller skate are retracted. Hinge 220 is locked in an open position (that is, foot support 18 is flat) when the wheels of the skate are down (that is, not retracted). The mechanism used to lock hinge 220 can be shared with the mechanism for locking the wheels in a down (that is, unretracted) position. For example, a stiff wire (not illustrated) could run from front wheel retraction mechanism 208 through the hinge 220 to rear wheel retraction mechanism 210. Longitudinal motion of this wire within its constraining track could lock all three assemblies simultaneously in the wheels-down configuration, and release them simultaneously for movement to a wheels-up configuration.

Temperature

As an alternative to the various temperature sensors 166 (FIG. 5), temperature can be deduced from the operation of motor 32. Using the voltage applied to motor 32 as measured by voltage sensor 172 (FIG. 6) and the current applied to motor 32 as measured by current sensor 170, the resistance of the motor windings can be determined. Typically the motor windings are copper which has a predetermined relationship between temperature and resistance. Thus, the temperature of the windings can be estimated when the resistance of the copper windings is known. The temperatures of critical electronic components can also be estimated from measurements of ambient temperatures supplemented by thermal models calculating the time-weighted effect of dissipated heat due to $I^2R$, where I is the current through the heated element and R is its electrical resistance. Similarly, the battery temperature can be estimated as a function of battery current over time.

Sensor Locations

The weight distribution sensors 54, 56 (FIG. 1a) can be located in a variety of positions, including, for example, on a top surface of foot support 18. Because the contour of the human foot varies from user to user, where weight sensors are located on a top surface of the foot support, a flat, stiff plate should be mounted over each sensor between the sensor and the foot to insure an even distribution of weight. In addition to pressure sensors 50, 54, 56, and 57 (FIGS. 1*a*, 1*b*), a total weight pressure sensor 176 (FIG. 1*b*) may embedded within foot support 18 and toe pressure sensors 222 can be embedded in foot support 18 to receive information from the user as the user wiggles his or her toes in prescribed patterns. Skate orientation sensor 173 (FIG. 1*a*) can also be incorporated within roller skate 10 to permit the user to exit from Mode 1 (step 106, FIG. 4) and into Modes 2, 3, or 4 when the user swings the skate in a prescribed manner and then, for example, forces the wheels to rotate forward within a prescribed time interval, for example, two seconds, after the skate moves, for example, from a vertical to a level (horizontal) orientation. Thus, instead of a six-position mode switch 93 (FIGS. 1*a*, 3), a two-position (off or on) switch may be employed, or no switch need be used, and the user can signal which mode he or she wants to be in through a predetermined series of leg or foot motions.

Other Possible Sensors

One or more shock sensors 177 (FIG. 1*c*), that include a mass (that is, a weight) which is free to move and, thus, stimulate a pressure or position sensor when the skate, and, thus, the weight, are accelerated abruptly (shocked), can also be incorporated in roller skate 10. The shock sensors send an electrical signal to controller 44 when the skate experiences a shock of a predetermined level, for example, when the user hits a crack in the road or a curb. The controller may respond by causing the motor to brake the rear axle.

Instead of mounting force gauge 57 to ankle strap 31 (FIG. 1*a*), a lever 178 (FIG. 1*a*) or an extended boot tongue that rests against the user's lower leg can be used in combination with a pressure or angle sensor to determine the angle between the user's foot and lower leg.

Because different users may impact sensors differently or the sensor readings may drift, controller 44 may include an automatic sensor recalibration mechanism. Recalibration can be based on an observed range of values during normal use or when the user deliberately exercises critical sensors over their desired dynamic range, perhaps during startup or a special calibration mode.

Motorized Wheel Locking

Instead of mechanical locking mechanism 95 (FIG. 1*c*) for locking the wheels in place during the wheels-locked mode, controller 44 may be configured to cause motor 32 to apply reverse or forward torque to the rear wheels as required to prevent rear wheel movement. Mechanical locks, however, have the advantage of not draining the battery. Another way to reduce power dissipation due only to user stabilization when the user is stationary is to apply stabilizing torques only after the skate rolls an allowable distance, perhaps a few centimeters; such actuation also alerts the user that better balance is required.

If the user is to use stairs safely or to have full walking stability, it is necessary to lock the wheels fore and aft. One alternative means for locking an undriven pair of wheels, or any single wheel, is to use some variation of a friction brake where a brake lining is placed in pressure contact with a rotating member coupled to the rotating wheel, or with the wheel itself, so as to slow the wheel down at the desired rate or to render it motionless. This pressure contact can be implemented by a separate electric motor driven by a separate port on the power electronics unit 76 in accordance with commands provided by a separate lower level control mechanism 90, or directly by the upper level control mechanism 92.

One variation would have two front steering wheels free to spin separately on one axle, where each wheel is rigidly coupled to a separate brake-pad forcing mechanism which forces the brake pad upon command to rub against the side of the wheel with pressure proportional to the desired braking force. The brake motor, perhaps through a worm gear pulling against springs can withdraw the brake pads from the wheels. Thus, brake-motor failure could trigger braking. This entire motor and brake assembly could be mounted rigidly to the front steering truck and could be connected by flexible wires to the motor controller. Alternatively, such motorized control could be applied to the sliding brake switch 95*c*.

Triggers

Optional triggering signals can initiate standardized braking or acceleration protocols, a skate mode change, locking or unlocking the skates or brakes, and identifying the skate owner. Such triggering signals can include: jumping which reduces weight on both skates below a predetermined threshold; stamping a skate once or twice; holding one skate aloft in specified orientations for predetermined periods; any step backward in space; a velocity greater than a predetermined threshold; initiation of a recognized braking action; clicking the heels of the two skates together and detecting this action with accelerometers (for example, two heel clicks at the correct interval might initiate motion); and tapping the toe or heel of the skate in a prescribed manner to stimulate a shock sensor.

User Indicators

User indicators 82 (FIG. 3) can include many devices, including simple indicator lights, acoustic signals from acoustic transducer 174 (FIG. 1*a*), and liquid-crystal displays. Useful indications produced by controller 44 include battery voltage and state of charge, likely skate travel range under available power, low-power warning signals, mode state, and malfunction indications. One or more lights may also be provided for use at night (that is, headlights) to illuminate the road immediately ahead of the skate and as a warning to motorists or others fore or aft. One or more light sources on the power electronics board may be coupled in desired directions by light waveguides, eliminating wires and permitting one light source to do the work of several.

Panic Button

In addition to the braking options discussed above, the user may be provided with a hand-held panic button (that is, a kill switch that initiates automatic braking).

Observed User Skills

The active control system of the present invention permits speed limits to be placed on the drive motor(s) dependent on the observed braking skill of the user, where more skill authorizes higher speed limits. For example, braking skill can be determined from the observed user stopping distances for various speeds, where observed shorter stopping distances and smoother decelerations merit higher allowed user velocities.

Cooling

Power dissipation is typically greatest in the motor and battery pack. This high power dissipation may require cooling, including conduction, radiation, and fluid convection. Radiators 610, 620 may be placed nearby. Reduced battery, motor, or power electronics loading may also be imposed by the controller when temperature sensors indicate a dangerous rise in temperature.

Rechargeable Batteries

The life and performance of rechargeable batteries is maximized by proper charging protocols. These protocols can readily be implemented by the controller 44. The state of battery charge can be estimated from computer-controlled battery-impedance measurements obtained using the power electronics circuits. By knowing the time of day and historic use patterns for the skates, better compromises can also be made by the controller 44 between rapid and slow charge protocols. Some batteries perform best if periodically discharged, and automatic deep discharges are also feasible, where the load might be a cooled resistor or the motor.

Exercise Mode

The skate controller 44 may require any desired level of user exertion by varying the motor decelerating (that is, resisting) torque. As a result, the controller can provide exercise alone without transportation. The controller can also keep track of a variety of parameters, such as amount of resisting torque (analogous to an exercise level), time spent exercising, total exercise accomplished, etc. For example, if the user pushes against a stationary bar or wall and walks forward, or walks up a hill or ramp while the controller is causing the motor to apply reverse torque (that is, the motor is trying to turn the wheels backwards), the skates can function as a treadmill by rolling backward at a prescribed velocity or with a prescribed torque, or by some linear combination of these two objectives, perhaps for a prescribed distance. An alternate exercise mode involves the user standing on a level surface and scissoring his/her legs and skates back and forth, thus exercising additional muscles; the controller can insure that a user defined level of exercise is maintained. Further, any combination of the treadmill and scissoring modes can be obtained by reducing the resisting torque when the skate is rolled forward, or, optionally, even by motoring the skate forward after a prescribed stride length in the backward direction is reached.

Figure 14:
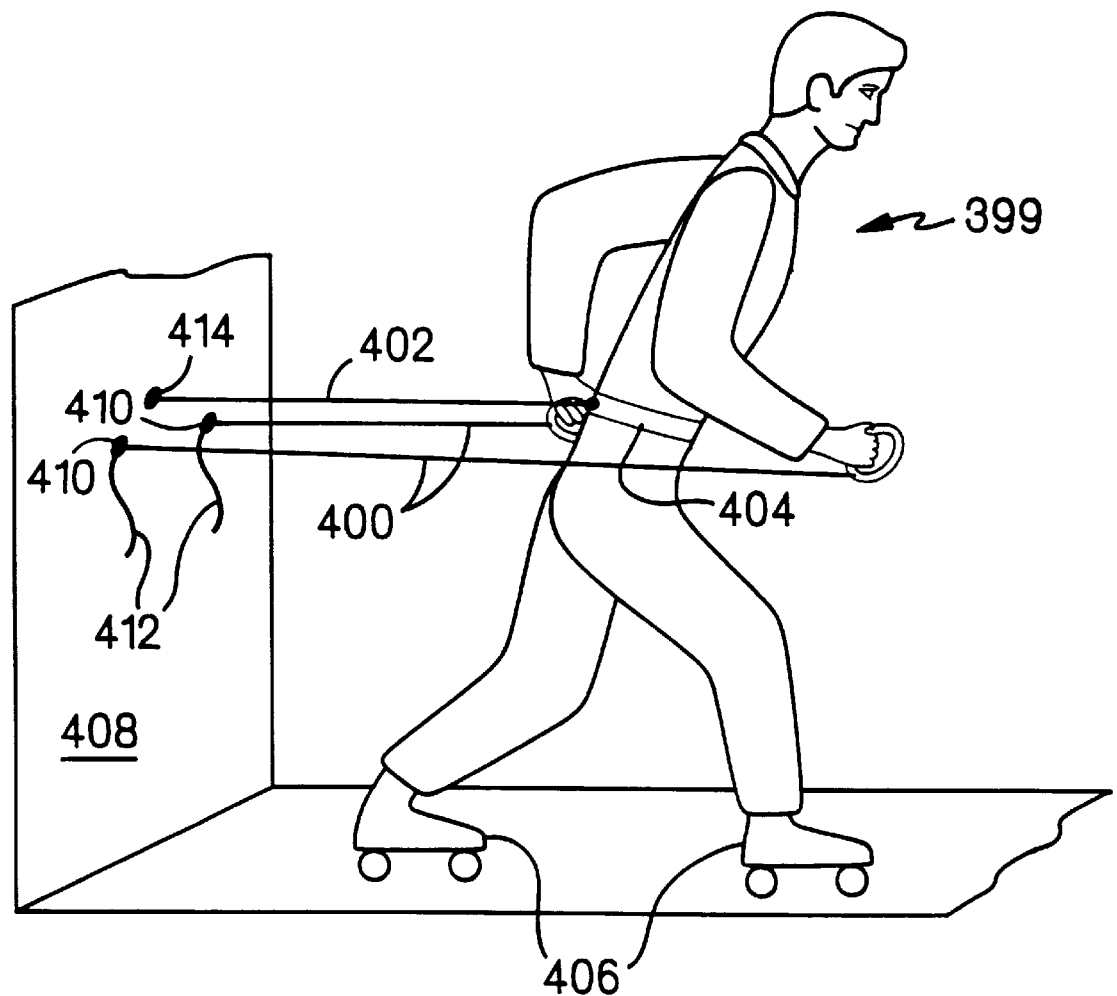
FIG. 14 is a perspective view of a user operating a pair of powered roller skates in an exercise mode.

Referring to FIG. 14, a user 399 wears a belt 404 that is attached by an elastic line 402 to a nearby wall 408, door jamb, window jamb, or other tie point 414, and then attempts to skate away from wall 408 using skates 406 which apply partial braking forces in accordance with the desired level of exercise. Simultaneous arm exercise can be provided by elastic cords 400 attached to wall tie points 410 so that the length of and, hence, the nominal tension in, cords 400 can be adjusted by varying the length of the loose cord ends 412. When wall attachments are inappropriate, the tie points 410, 414 may be merged in a single tie point consisting of a thin, bent, slightly elastic fixture inserted in a door jamb or window jamb so as to pull on the far side of the door or window and so as to be sufficiently wedged as to not fall or detach when tension in the lines vanishes. The partial braking forces can alternatively be established mechanically in the absence of a motor or motor controller.

The prescribed torque or velocity and prescribed operating mode and characteristics can be preset or set by the user through any of a variety of signalling techniques, such as those described above. The work performed on the motors can be used to charge the batteries, heat the motors or a cooled resistive load, heat a mechanically resistive load, or electrically power an external load. The controller can keep track of all user exercise and provide signals reporting the user's progress, perhaps by acoustic beeps, computer printout, or synthesized speech from a small acoustic transducer on the skates.

Security Devices

A variety of security devices may be incorporated in roller skate 10 (FIG. 1*a*). For example, the skate can be easily immobilized by controller 44 if the weight distribution sensors detect a new user weight beyond a predetermined range or until an authorization code is input using leg motions (detected by pressure or orientation sensors), switch manipulation, speech recognition, or through a keypad requiring a particular combination input.

Speech Recognition

Not only can speech recognition be used to input authorization codes, but through speech recognition sensors, comprising a microphone, computer, and speech recognition software, a user can verbally command the skates. For instance, a user can say "brake" to slow down, "stop" to completely stop, and "faster" to accelerate. Additionally, to prevent the skates from responding to the speech of others, the controller can be programmed to respond to a verbal command only after a predetermined initial verbal or sensor trigger is given followed by verbal commands. In this instance, of course, the necessary computer hardware and software would be installed in controller 44.

Safety Devices

A variety of user safety devices can be incorporated in roller skate 10. For instance, different users of the same skates might be assigned different speed limits or different default modes and parameters. Rented or leased skates may also cease operation unless an authorization code is periodically received reflecting payments. The authorization codes can be input in many ways including through switches or communicated through coded audio signals over the telephone to an audio transducer 305 (FIG. 1*a*) on one or both of the skates or through a telephone modem 606 (FIG. 1*c*) on one or both of the skates. The same audio transducer can support diagnostic and service functions to update computer programs or allow for skate customization. Built-in driver-testing or road characterization programs can be used to establish speed limits or other control parameters. For example, erratic acceleration, braking, weaving, or road vibration can cause controller 44 to lower the speed limits.

Interskate Communication

Instead of providing interskate communication through coded very-low-power modulated magnetic dipole near-field radiation, wires running up one of the user's legs and down the other can physically connect the interskate communication systems of both skates.

Internal Carrying Bag

To facilitate transparent transitions between skating, traveling in automobiles or public transportation, and walking with or without skates on, a waterproof bag 450 (FIG. 1*c*) can be provided to enclose the skates and to protect the user from dirt or water left on the skates. The bag can also have back straps or a belt to permit easy carriage of the skates on the user's back or waist. Such a bag can be stored inside a case 452 attached to one or both skates and pulled out by grasping a small handle 454. The other end of the bag can be attached to an elastic member 456 which pulls the bag inside the skate and out of sight after the bag no longer encloses the skates.

Fenders

To prevent the wheels on adjacent skates from rubbing against each other and braking or perhaps toppling the user, a fender, like a car fender, can be attached to the roller skate in proximity to each wheel to preclude contact between the wheels of adjacent skates.

Trailer for Baggage

Figure 13:
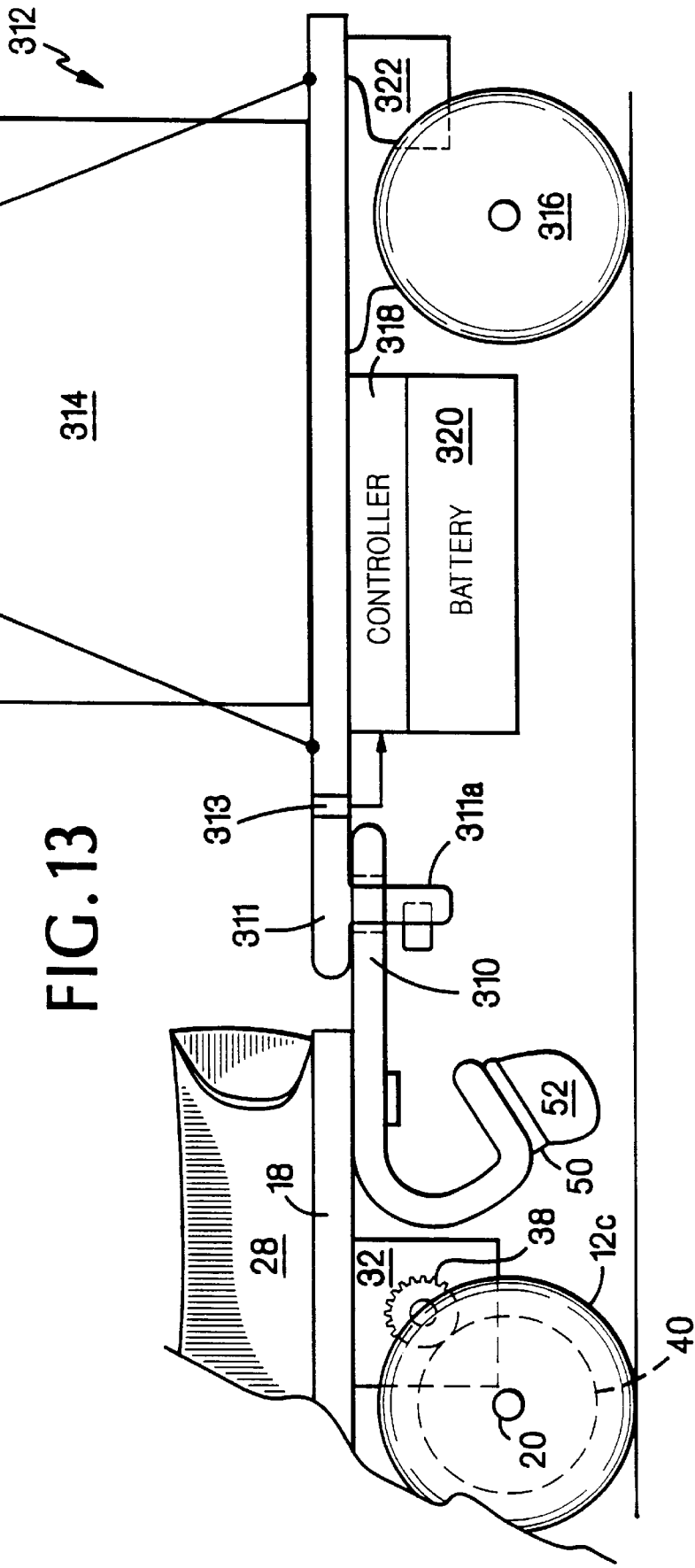
FIG. 13 is a side view of a baggage trailer attached to the powered roller skate of FIGS. 1a, 1b, 1c.

Referring to FIG. 13, an alternative embodiment of a powered roller skate includes a mounting mechanism 310, for example, a trailer hitch (similar to those provided for automobiles), that allows the roller skate to be connected to a separate trailer 312. The trailer can be used to convey baggage 314, such as a brief case or grocery bag, possibly secured by straps 326. The trailer includes a baggage support 311 having a hitching mechanism 311*a* that can be used to mechanically couple the trailer to the roller skate. The baggage support is supported by a separate load-bearing wheel 316, or set of wheels, and that turn without impeding the user's turns, and go straight without deflecting the user's normal forward motion. The trailer might be in the form of a two-wheel trailer attached to one of the skates, and may or may not have its own controller 318, battery pack 320, and motor 322. A separate motor 322 and battery pack 320 may allow the trailer to carry larger loads and minimize stress on mounting mechanism 310 and hitching mechanism 311, and roller skate motor 32. This stress can be measured by stress sensor 313, connected to controller 318. The trailer may also be in the form of a one-wheel platform or side car (not shown) attached more rigidly to the side of one of the skates.

Additions, subtractions, and other modifications of the invention will be apparent to those practiced in the art and are within in the following claims.

What is claimed is:

1. A powered roller skate comprising:
   a foot support adapted to be worn on a single foot of a user;
   a plurality of wheels rotatably mounted to the foot support for skating thereon;
   a motor coupled to at least one of the wheels; and
   an active control system including:
      a sensor located on the skate; and
      a controller coupled to the sensor and to the motor; the controller adapted to, in response to electrical signals received from the sensor and the motor, and in accordance with a control mechanism, send electrical signals to the motor to control operation of the motor.

2. The powered roller skate according to claim 1, wherein the sensor detects skating motion and wherein the electrical signals sent from the sensor to the controller represent the sensed skating motion.

3. The powered roller skate according to claim 2, wherein the sensor is responsive to weight distribution.

4. The powered roller skate according to claim 3, wherein the sensor is mounted to the foot support to detect pressure applied to the foot support.

5. The powered roller skate according to claim 4, wherein the sensor is embedded in a forward portion of the foot support.

6. The powered roller skate according to claim 5, wherein the controller is adapted to send electrical signals to the motor to cause the motor to accelerate when the sensor senses that weight on the forward portion of the foot support falls within a predetermined range.

7. The powered roller skate according to claim 6, wherein the controller is adapted to cause the motor to accelerate as a function of the pressure detected by the sensor.

8. The powered roller skate according to claim 6, wherein the controller is adapted to send electrical signals to the motor to cause the motor to decelerate when the sensor senses that weight on the forward portion of the foot support is outside of the predetermined range.

9. The powered roller skate according to claim 8, wherein the controller is adapted to cause the motor to decelerate in inverse proportion to the pressure detected by the sensor.

10. The powered roller skate according to claim 4, wherein the sensor is embedded in a rearward portion of the foot support.

11. The powered roller skate according to claim 10, wherein the controller is adapted to send electrical signals to the motor to cause the motor to decelerate when the sensor senses that weight on the rearward portion of the foot support exceeds a predetermined threshold.

12. The powered roller skate according to claim 11, wherein the controller is adapted to cause the motor to decelerate as a function of the pressure detected by the sensor.

13. The powered roller skate according to claim 11, further including a second pressure sensor, coupled to the controller, for sending electrical signals representing a weight distribution of the user to the controller, and wherein the second pressure sensor is embedded in a forward portion of the foot support.

14. The powered roller skate according to claim 13, wherein the controller is adapted to send electrical signals to the motor to cause the motor to accelerate when signals from the pressure sensors indicate a forward distribution of the user's weight.

15. The powered roller skate according to claim 14, wherein the controller is adapted to cause the motor to accelerate as a function of the forward distribution of the user's weight.

16. The powered roller skate according to claim 13, wherein the controller is adapted to send electrical signals to the motor to cause the motor to decelerate when signals from the pressure sensors indicate a rearward distribution of the user's weight.

17. The powered roller skate according to claim 16, wherein the controller is adapted to cause the motor to decelerate as a function of the rearward distribution of the user's weight.

18. The powered roller skate according to claim 3, wherein the plurality of wheels are rotatably mounted to the foot support through a plurality of axles and wherein the sensor is coupled to one of the plurality of axles.

19. The powered roller skate according to claim 1, wherein the sensor is a pressure sensor and is mounted to the foot support for detecting a user's total weight, and wherein the controller is adapted to send electrical signals to the motor to prevent the motor from starting when the weight detected by the sensor falls outside of a predetermined range.

20. The powered roller skate according to claim 1, wherein the sensor is a pressure sensor embedded in a forward portion of the foot support for detecting pressure from a user's toes.

21. The powered roller skate according to claim 20, wherein the controller controls the motor in accordance with detected predetermined patterns of pressure on the pressure sensor.

22. The powered roller skate according to claim 21, wherein the detected predetermined patterns of pressure on the pressure sensor indicate a plurality of operational modes according to which the controller controls the motor.

23. The powered roller skate according to claim 2, wherein the sensor is responsive to an angle between the user's foot and lower leg, the angle indicating skating motion.

24. The powered roller skate according to claim 23, wherein the controller is adapted to send electrical signals to the motor to cause the motor to accelerate when the angle is less than a predetermined threshold.

25. The powered roller skate according to claim 24, wherein the controller is adapted to cause the motor to accelerate as a function of the angle detected by the sensor.

26. The powered roller skate according to claim 23, wherein the controller is adapted to send electrical signals to the motor to cause the motor to decelerate when the angle is greater than a predetermined threshold.

27. The powered roller skate according to claim 26, wherein the controller is adapted to cause the motor to decelerate as a function of the angle detected by the sensor.

28. The powered roller skate according to claim 2, wherein the sensor is responsive to skate orientation.

29. The powered roller skate according to claim 28, wherein the controller is adapted to send electrical signals to the motor to cause the motor to decelerate when a signal from the sensor indicates that the skate is outside of a predetermined orientation range.

30. The powered roller skate according to claim 29, wherein the controller is adapted to cause the motor to decelerate as a function of the orientation detected by the sensor.

31. The powered roller skate according to claim 28, wherein the controller is adapted to control the operation of the motor in accordance with detected predetermined patterns of skate orientation.

32. The powered roller skate according to claim 31, wherein the controller is adapted to send electrical signals to the motor to start the motor in response to a particular detected pattern of orientation.

33. The powered roller skate according to claim 31, wherein the detected predetermined patterns of orientation indicate a plurality of operational modes according to which the controller controls the motor.

34. The powered roller skate according to claim 1, further comprising a skid pad mounted to the foot support, wherein the sensor is a pressure sensor and is coupled to the skid pad to detect pressure on the skid pad.

35. The powered roller skate according to claim 34, wherein the controller is adapted to send electrical signals to the motor to cause the motor to decelerate when the sensor detects pressure above a predetermined threshold.

36. The powered roller skate according to claim 35, wherein the controller is adapted to cause the motor to decelerate as a function of the amount of pressure detected by the sensor.

37. The powered roller skate according to claim 34, wherein the skid pad is mounted to a heel portion of the foot support.

38. The powered roller skate according to claim 1, wherein the sensor is a temperature sensor.

39. The powered roller skate according to claim 38, wherein the controller is adapted to reduce current to the motor when the sensor detects a temperature above a predetermined threshold.

40. The powered roller skate according to claim 38, wherein the controller is adapted to reduce current to the motor as a function of the temperature detected by the sensor.

41. The powered roller skate according to claim 38, wherein the controller is adapted to send electrical signals to the motor to prevent the motor from starting when the sensor detects a temperature below a predetermined threshold.

42. The powered roller skate according to claim 38, wherein the temperature sensor is responsive to an environmental temperature.

43. The powered roller skate according to claim 38, wherein the temperature sensor is responsive to motor temperature.

44. The powered roller skate according to claim 38, wherein the controller includes electronic components and wherein the temperature sensor is responsive to the temperature of the electronic components.

45. The powered roller skate according to claim 38, wherein the motor is an electric motor and wherein the roller skate further comprises a battery pack coupled to the motor for supplying power to the motor, and wherein the temperature sensor is responsive to the temperature of the battery pack.

46. The powered roller skate according to claim 1, wherein the controller is adapted to determine motor temperature as a function of motor winding resistance.

47. The powered roller skate according to claim 1, wherein the motor is an electric motor and the controller is adapted to determine motor temperature as a function of the history of motor current and environmental temperature, in accordance with a thermal model defined by the control mechanism, the controller also adapted to limit, in response to excessive motor temperature, the maximum allowed motor current.

48. The powered roller skate according to claim 1, wherein the sensor is a shock sensor.

49. The powered roller skate according to claim 48, wherein the controller is adapted to send electrical signals to the motor to cause the motor to decelerate when the shock sensor detects a shock applied to the skate of a magnitude above a predetermined threshold.

50. The powered roller skate according to claim 49, wherein the controller is adapted to cause the motor to decelerate as a function of the shock detected by the sensor.

51. The powered roller skate according to claim 48, wherein the controller is adapted to control the motor in accordance with a predetermined pattern of shocks detected by the shock sensor.

52. The powered roller skate according to claim 51, wherein the controller is adapted to send electrical signals to the motor to start the motor in response to a particular predetermined pattern of shocks.

53. The powered roller skate according to claim 51, wherein the detected predetermined patterns of shock indicate a plurality of operational modes according to which the controller controls the motor.

54. The powered roller skate according to claim 1, wherein the controller includes a sensor recalibration mechanism for automatically, periodically recalibrating the sensor.

55. The powered roller skate according to claim 1, wherein the sensor is a range sensor for detecting the distance between the powered roller skate and another powered roller skate.

56. The powered roller skate according to claim 52, wherein the controller is adapted to send electrical signals to the motor to cause the motor to decelerate when the roller skate is more than a predetermined distance ahead of said another powered roller skate.

57. The powered roller skate according to claim 56, wherein the controller is adapted to control the motor as a function of a distance between the roller skate and another roller skate.

58. The powered roller skate according to claim 57, wherein the controller is adapted to send electrical signals to the motor to cause the motor to accelerate when the roller skate is more than a predetermined distance behind said another powered roller skate.

59. The powered roller skate according to claim 1, wherein the sensor is a pressure sensor mounted on a side of the foot support for detecting a lateral weight distribution of the user.

60. The powered roller skate according to claim 59, wherein the controller is adapted to send electrical signals to the motor to cause the motor to turn at least one of the plurality of wheels in accordance with said lateral weight distribution.

61. The powered roller skate according to claim 1, wherein the sensor is a mode switch constructed and arranged to be manipulated by the user to indicate an operational mode.

62. The powered roller skate according to claim 1, wherein the sensor is a kill switch which is adapted to, when manipulated by the user, cause the controller to send electrical signals to the motor to stop the motor.

63. The powered roller skate according to claim 1, wherein the control mechanism includes a plurality of operational parameters for controlling the motor.

64. The powered roller skate according to claim 63, wherein the operational parameters include a speed limit, and wherein the controller is adapted to cause the motor to decelerate if motor angular velocity exceeds the speed limit.

65. The powered roller skate according to claim 63, wherein operational parameters are automatically set in accordance with the user's skating ability as detected by the sensor.

66. The powered roller skate according to claim 63, wherein operational parameters are automatically set in accordance with road conditions as detected by the sensor.

67. The powered roller skate according to claim 63, wherein operational parameters are automatically set in accordance with the user's skating ability as determined from motor current history and motor voltage history.

68. The powered roller skate according to claim 63, wherein operational parameters are automatically set in accordance with road conditions as determined from motor current history and motor voltage history.

69. The powered roller skate according to claim 1, wherein the controller comprises
an upper level control mechanism, and
a lower level control mechanism adapted to:
electrically communicate with the motor,
estimate motor torque using electrical signals from the motor,
receive electrical signals from the sensor, and
send to the upper level control mechanism electrical signals representing the estimated motor torque and the electrical signals received from the sensor, and
wherein the upper level control mechanism is adapted to send, in response to electrical signals received from the lower level control mechanism, electrical signals to the lower level control mechanism indicating a desired motor torque.

70. The powered roller skate according to claim 1, wherein the controller comprises
an upper level control mechanism, and
a lower level control mechanism adapted to:
electrically communicate with the motor,
estimate motor angular velocity using electrical signals from the motor,
receive electrical signals from the sensor, and
send to the upper level control mechanism electrical signals representing the estimated motor angular velocity and the electrical signals received from the sensor, and
wherein the upper level control mechanism is adapted to send, in response to electrical signals received from the lower level control mechanism, electrical signals to the lower level control mechanism indicating a desired motor angular velocity.

71. The powered roller skate according to claim 1, wherein the controller comprises
an upper level control mechanism, and
a lower level control mechanism adapted to:
electrically communicate with the motor,
estimate motor torque and angular velocity using electrical signals from the motor,
receive electrical signals from the sensor, and
send to the upper level control mechanism electrical signals representing the estimated motor torque and angular velocity and the electrical signals received from the sensor, and
wherein the upper level control mechanism is adapted to send, in response to electrical signals received from the lower level control mechanism, electrical signals to the lower level control mechanism indicating a desired motor torque, angular velocity, and angular acceleration.

72. The powered roller skate according to claim 1, wherein the controller includes a computer having a central processing unit, a clock, and a memory.

73. The powered roller skate according to claim 72, further including a battery back-up unit electrically coupled to the computer.

74. The powered roller skate according to claim 1, further comprising an input/output port for electrically coupling the controller to an input/output bus.

75. The powered roller skate according to claim 1, further comprising
a battery pack electrically coupled to the motor for supplying electrical power to the motor, wherein the battery pack contains at least one rechargeable battery, and
a recharging port electrically coupled to the battery pack for recharging the rechargeable battery.

76. The powered roller skate according to claim 1, further comprising
a power output port coupled to the controller for supplying electrical power to external devices.

77. The powered roller skate according to claim 1, further comprising
an interskate communication system coupled to the controller for sending data to and receiving data from an external communication system.

78. The powered roller skate according to claim 77, wherein the interskate communication system is adapted to
send information to the external communication system to indicate a status of the powered roller skate, and
receive data from the external communication system for modifying the control mechanism.

79. The powered roller skate according to claim 77, wherein the external communication system is another interskate communication system of another powered roller skate worn by said user.

80. The powered roller skate according to claim 79, wherein the controller is adapted to send electrical signals to the interskate communication system to cause the interskate communication system to share braking data with said another interskate communication system.

81. The powered roller skate according to claim 79, wherein the controller is adapted to send electrical signals to the interskate communication system to cause the interskate communication system to share velocity data with said another interskate communication system.

82. The powered roller skate according to claim 81, wherein the controller is adapted to send electrical signals to the motor to maintain a desired average velocity between the powered roller skate and said another powered roller skate and to prevent a difference between the skate velocities from exceeding a predetermined threshold.

83. The powered roller skate according to claim 82, wherein the controller is adapted to allow differential skate velocity to vary within the predetermined threshold unless skate separation exceeds a second predetermined threshold.

84. The powered roller skate according to claim 79, wherein the controller is adapted to send electrical signals to the interskate communication system to cause the interskate communication system to share acceleration data with said another interskate communication system.

85. The powered roller skate according to claim 79, wherein the controller is adapted to send electrical signals to the interskate communication system to cause the interskate communication system to share mode change data with said another interskate communication system.

86. The powered roller skate according to claim 79, wherein interskate communications are provided through coded very-low-power modulated magnetic dipole near-field radiation.

87. The powered roller skate according to claim 79, wherein the interskate communication system is connected to said another interskate communication system through wires.

88. The powered roller skate according to claim 1, wherein the controller is adapted to send, in accordance with an operational mode defined by the control mechanism, electrical signals to the motor to prevent the wheels from rotating.

89. The powered roller skate according to claim 1, further comprising a wheel locking mechanism mechanically coupled to the plurality of wheels and constructed to, when activated, prevent the wheels from rotating.

90. The powered roller skate according to claim 89, wherein the plurality of wheels are rotatably mounted to the foot support through a plurality of axles and wherein the wheel locking mechanism includes:

at least one tube mounted to the foot support; and at least one wire slidably disposed within the tube and arranged to prevent one of the wheels from rotating when advanced within the tube and to allow one of the wheels to rotate when pulled back within the tube.

91. The powered roller skate according to claim 1, wherein the controller is adapted to send, in accordance with an operational Mode defined by the control mechanism, electrical signals to the motor to compensate for motor friction.

92. The powered roller skate according to claim 1, wherein the controller is adapted to send, in accordance with an operational mode defined by the control mechanism, electrical signals to the motor to maintain a skate velocity established when the skate was last set down on a surface.

93. The powered roller skate according to claim 1, wherein the sensor is a pressure sensor coupled to the foot support for detecting a user weight distribution across the foot support and wherein the controller is adapted to send, in accordance with an operational mode defined by the control mechanism, electrical signals to the motor to establish a motor torque that accelerates and decelerates the skate in accordance with changes in the detected weight distribution.

94. The powered roller skate according to claim 1, wherein the sensor is responsive to an angle between a foot and lower leg of the user and wherein the controller is adapted to send, in accordance with an operational mode defined by the control mechanism, electrical signals to the motor to accelerate and decelerate the skate in accordance with changes in said angle.

95. The powered roller skate according to claim 94, further comprising a foot embracing means, and wherein the sensor comprises a lever coupled to the foot embracing means.

96. The powered roller skate according to claim 1, wherein the sensor is responsive to a relative position of another powered roller skate worn by said user and wherein the controller is adapted to send, in accordance with an operational mode defined by the control mechanism, electrical signals to the motor to accelerate and decelerate the skate in accordance with changes in the relative position of the powered roller skate with respect to said another powered roller skate.

97. The powered roller skate according to claim 1, further comprising a battery pack electrically coupled to the motor for supplying electrical power to the motor, wherein the battery pack contains at least one rechargeable battery and wherein excess energy supplied by the user to move the skate is transferred to the battery pack to recharge the rechargeable battery.

98. The powered roller skate according to claim 1, further comprising an indicator device electrically coupled to the controller, for providing information to the user.

99. The powered roller skate according to claim 98, wherein the indicator device is adapted to visually display the information to the user.

100. The powered roller skate according to claim 98, wherein the indicator device is adapted to acoustically transmit the information to the user.

101. The powered roller skate according to claim 1, wherein the motor is a brushless, permanent magnet electric motor.

102. The powered roller skate according to claim 101, further comprising a battery pack electrically coupled to the motor. wherein the battery pack is mounted to the foot support.

103. The battery roller skate according to claim 102, wherein the battery pack is mounted to the foot support.

104. The powered roller skate according to claim 1, wherein the motor is an internal combustion engine.

105. The powered roller skate according to claim 1, further comprising a plurality of axles through which the plurality of wheels are mounted to the foot support, wherein the motor is coupled through a pair of spur gears to one of the plurality of axles.

106. The powered roller skate according to claim 1, wherein the plurality of wheels include two front wheels rotatably coupled to a first axle which is mounted to a front portion of the foot support through a first axle assembly and two rear wheels rotatably coupled to a second axle which is mounted to a rear portion of the foot support through a second axle assembly.

107. The powered roller skate according to claim 106, wherein the two front wheels are movably mounted with respect to the two rear wheels to allow the two front wheels to be mounted varying distances from the two rear wheels.

108. The powered roller skate according to claim 1, wherein the plurality of wheels are rotatably mounted to the foot support in an in-line wheel configuration.

109. The powered roller skate according to claim 1, further comprising a foot embracing mechanism, mounted to the foot support, for securing the foot of the user to the foot support.

110. The powered roller skate according to claim 109, wherein the foot embracing mechanism comprises a shoe that is secured to the foot support.

111. The powered roller skate according to claim 109, wherein the foot embracing mechanism is adjustable.

112. The powered roller skate according to claim 109, wherein the foot embracing mechanism includes a toe strap, an upper-foot binding strap coupled to the toe strap, a heel strap, and an ankle strap coupled to the heel strap.

113. The powered roller skate according to claim 109, wherein the foot embracing mechanism includes an outer skin for enveloping the foot of the user.

114. The powered roller skate according to claim 1, wherein the foot support includes a first portion and a second portion slidably disposed relative to the first portion, to fit feet of different sizes.

115. The powered roller skate according to claim 1, wherein the wheels are rotatably mounted to the foot support through wheel retraction mechanisms.

116. The powered roller skate according to claim 115, wherein the foot support includes two portions connected together through a flexible joint.

117. The powered roller skate according to claim 1, further comprising a security device for disallowing an unauthorized user use of the powered roller skate.

118. The powered roller skate according to claim 117, wherein the security device is a mechanical lock released with a key.

119. The powered roller skate according to claim 117, wherein the security device is an electronic key pad activated with a predetermined sequence of characters.

120. The powered roller skate according to claim 1, wherein the sensor is a speech recognition sensor for receiving verbal user commands.

121. The powered roller skate according to claim 1, wherein the sensor is an audio transducer for receiving acoustic information.

122. The powered roller skate according to claim 121, wherein the acoustic information includes an authorization code.

123. A powered roller skate comprising:
 a foot support adapted to be worn on a single foot of a user;
 a plurality of wheels rotatably mounted to the foot support for skating thereon;
 a motor coupled to at least one of the wheels; and
 an active control system including:
  a sensor;
  a detector for detecting an operational mode of the skate; and
  a controller coupled to the sensor, the detector, and the motor; the controller adapted to, in response to electrical signals from the detector indicating the operational mode of the skate, select an operational mode;
  the controller further adapted to send, in response to electrical signals from the sensor and from the motor, and in accordance with the selected operational mode and a control mechanism, electrical signals to the motor to control operation of the motor.

124. The powered roller skate according to claim 123, wherein the controller is adapted to prevent the wheels from rotating in response to the selected operational mode.

125. The powered roller skate according to claim 123, wherein the controller is adapted to compensate for motor friction in accordance with the selected operational mode.

126. The powered roller skate according to claim 123, wherein the controller is adapted to maintain a skate velocity established when the skate was last set down on a surface, in accordance with the selected operational mode.

127. The powered roller skate according to claim 126, wherein the sensor is adapted to detect when the skate is set down on a surface.

128. The powered roller skate according to claim 126, wherein the controller is adapted to determine, from the electrical signals from the motor, when the skate is set down on a surface.

129. The powered roller skate according to claim 123, wherein the sensor is a pressure sensor coupled to the foot support for detecting a user weight distribution across the foot support and wherein the controller is adapted to accelerate and decelerate the skate in accordance with the detected weight distribution and the selected operational mode.

130. The powered roller skate according to claim 123, wherein the sensor is responsive to an angle between a foot and lower leg of the user and wherein the controller is adapted to accelerate and decelerate the skate in accordance with said angle and the selected operational mode.

131. The powered roller skate according to claim 130, further comprising a foot embracing means, and wherein the sensor comprises a lever coupled to the foot embracing means.

132. The powered roller skate according to claim 123, wherein the sensor is responsive to a relative position of another powered roller skate worn by said user and wherein the controller is adapted to send, in accordance with an operational mode defined by the control mechanism, electrical signals to the motor to accelerate and decelerate the skate in accordance with said relative position.

133. A pair of powered roller skates, each skate comprising:
 a foot support adapted to be worn on a single foot of a user;
 a plurality of wheels rotatably mounted to the foot support for skating thereon;
 a motor coupled to at least one of the wheels; and
 an active control system including:
  a communication system for communicating with the other skate; and
  a controller coupled to the communication system and to the motor; the controller adapted to, in response to electrical signals from the communication system and from the motor, and in accordance with a control mechanism, send electrical signals to the communication system to aid in coordinating movement of the pair of skates, and to send electrical signals to the motor to control the operation of the motor.

134. The pair of powered roller skates according to claim 133, wherein the communication systems are adapted to send and receive braking date in response to the electrical signals sent to the communication systems of each skate by the controllers of each skate.

135. The pair of powered roller skates according to claim 133, wherein the communication systems are adapted to send and receive skate velocity date in response to the electrical signals sent to the communication systems of each skate by the controllers of each skate.

136. The pair of powered roller skates according to claim 133, wherein the controllers are adapted to maintain an average velocity between the powered roller skates and prevent a difference between the two skate velocities from exceeding a predetermined threshold.

137. The pair of powered roller skates according to claim 136 wherein the controllers are adapted to allow the velocity difference to vary within the predetermined threshold unless skate separation exceeds a second predetermined threshold.

138. The pair of powered roller skates according to claim 132, wherein the communication systems communicate through coded very-low-power modulated magnetic dipole near-field radiation.

139. An automatic braking system for use with a powered roller skate having a plurality of wheels rotatable mounted to a foot support adapted to be worn on a single foot of a user, the braking system comprising:

means for determining when the skate has been stationary for a predetermined amount of time;

means for preventing, in response to an electrical signal from the determining means indicating that the skate has been stationary for a predetermined amount of time, at least one of the wheels from turning; and means for detecting a restart trigger, wherein the preventing means, in response to an electrical signal from the detecting means indicating that the restart trigger has been detected, allows at least one of the wheels to turn.

140. A powered roller skate comprising:

a foot support adapted to be worn on a single foot of a user;

a plurality of wheels rotatably mounted to the foot support for skating thereon;

a motor coupled to at least one of the wheels; and an active control system including:
    a communication mechanism for communicating information about the skate external to the skate; and
    a controller coupled to the communication mechanism; the controller adapted to, in accordance with a control mechanism, send electrical signals to the communication mechanism to cause the communication mechanism to indicate a status of the skate external to the skate.

141. The powered roller skate according to claim 140, wherein the communication mechanism is adapted to visually display the information to the user.

142. The powered roller skate according to claim 140, wherein the communication mechanism is adapted to acoustically transmit the information to the user.

143. A powered roller skate comprising:

a foot support adapted to be worn on a single foot of a user;

a plurality of wheels rotatably mounted to the foot support for skating thereon;

a motor coupled to at least one of the wheels; and an active control system including:
    a communication device for communicating information about the skate external to the skate; and
    a controller coupled to the communication device; the controller adapted to send electrical signals to the communication device to cause the communication device to indicate a status of the skate external to the skate;
    the controller further adapted to modify, in response to electrical signals received from the communication device, a control mechanism and control parameters to update the control mechanism.

144. The powered roller skate according to claim 143, wherein the communication device is an input/output port for connection to an input/output bus.

145. The powered roller skate according to claim 144, wherein the input/output bus is a Small Computer System Interconnect bus.

146. The powered roller skate according to claim 144, wherein the input/output port is a telephone modem.

147. A powered roller skate comprising:

a foot support adapted to be worn on a single foot of a user;

a plurality of wheels rotatably mounted to the foot support for skating thereon;

a motor coupled to at least one of the wheels; and an active control system including:
    a sensor; and
    a controller coupled to receive electrical signals from the sensor; the controller adapted to modify, in response to electrical signals received from the sensor, and in accordance with a control mechanism, control parameters to update the control mechanism.

148. The powered roller skate according to claim 147, wherein the sensor is an audio transducer.

149. The powered roller skate according to claim 147, wherein the communication device is a speech recognition sensor.

150. The powered roller skate according to claim 147, wherein the communication device is a switch.

151. The powered roller skate according to claim 147, wherein the communication device is a keypad.

152. A security system for use with a powered roller skate having a plurality of wheels rotatably mounted to a foot support adapted to be worn on a single foot of a user, the security system comprising:

means for detecting an end-of-use trigger;

means for preventing, in response to an electrical signal from the end-of-use trigger detecting means indicating that the end-of-use trigger has been detected, at least one of the wheels from turning; and means for detecting a security trigger, wherein the preventing means, in response to an electrical signal from the security trigger detecting means indicating that the security trigger has been detected, allows all of the wheels to turn.

153. The security system according to claim 152, wherein the end-of-use detecting means is a switch with more than one position and the end-of-use trigger is one of the switch positions.

154. The security system according to claim 152, wherein the end-of-use detecting means includes a sensor that detects when the skate has been stationary for a predetermined amount of time.

155. The security system according to claim 152, wherein the end-of-use detecting means includes a controller and a motor and wherein the controller is adapted to receive electrical signals from the motor and to determine from these signals when the skate has been stationary for a predetermined amount of time.

156. The security system according to claim 152, wherein the end-of-use detecting means includes a pressure sensor for detecting when the skate has been unweighted for a predetermined amount of time.

157. The security system according to claim 152, wherein the preventing means includes a controller and a motor, the controller adapted to send, in response to the electrical signal from the end-of-use detecting means, electrical signals to the motor to prevent the wheels from rotating, the controller also adapted to send, in response to the electrical signal from the security trigger detecting means, electrical signals to the motor to allow the wheels to rotate.

158. The security system according to claim 152, wherein the security trigger detecting means includes a sensor responsive to the security trigger.

159. The security system according to claim 158, wherein the security trigger detecting means includes a controller and a motor and wherein the controller is adapted to receive electrical signals from the motor and thereby to detect the security trigger.

160. A powered roller skate comprising:

a foot support adapted to be worn on a single foot of a user;

a plurality of wheels rotatably mounted to the foot support for skating thereon;

a motor coupled to at least one of the wheels; and an active control system including:
- a detector for detecting when the skate is set down on a surface; and
- a controller coupled to the detector and to the motor; the controller adapted to set, in response to electrical signals from the detector and the motor, and in accordance with a control mechanism, motor torque to maintain a skate velocity established when the skate was last set down on a surface.

161. A powered roller skate comprising:

a foot support adapted to be worn on a single foot of a user;

a plurality of wheels rotatably mounted to the foot support for skating thereon;

a motor coupled to at least one of the wheels; and an active control system including:
- a detector for detecting an angle between the foot and lower leg of the user; and
- a controller coupled to the detector and to the motor; the controller adapted to send, in response to electrical signals from the detector and the motor, and in accordance with a control mechanism, electrical signals to the motor to activate the motor such that skate velocity is increased and decreased according to said angle.

162. A powered roller skate comprising:

a foot support adapted to be worn on a single foot of a user;

a plurality of wheels rotatably mounted to the foot support for skating thereon;

a motor coupled to at least one of the wheels; and an active control system including:
- a detector responsive to a relative position of another powered roller skate; and
- a controller coupled to the detector and to the motor; the controller adapted to send, in response to electrical signals from the detector and the motor, and in accordance with a control mechanism, electrical signals to the motor to activate the motor such that skate velocity is increased and decreased according to the relative position of said another powered roller skate.

163. The powered roller skate of claim 162, further comprising a second detector responsive to an angle between the foot and lower leg of the user, and wherein the controller is adapted to send, in response to electrical signals from the second detector and the motor, and in accordance with the control mechanism, electrical signals to the motor to control skate velocity according to said angle.

164. The powered roller skate of claim 163, further comprising a third detector for detecting when the skate is set down on a surface, and wherein the controller is adapted to set, in response to electrical signals from the fourth detector and the motor, and in accordance with the control mechanism, the motor torque to maintain a skate velocity established when the skate was last set down on a surface.

165. The powered roller skate of claim 164, further comprising a fourth detector responsive to weight distribution across the foot support, and wherein the controller is adapted to send, in response to electrical signals from the third detector and the motor, and in accordance with the control mechanism, electrical signals to the motor to control skate velocity according to the weight distribution across the foot support.

166. A powered roller skate comprising:

a foot support adapted to be worn on a single foot of a user;

a plurality of wheels rotatably mounted to the foot support for skating thereon;

a motor coupled to at least one of the wheels; and an active control system including:
- a detector for detecting an exercise mode of the skate; and
- a controller coupled to the detector and to the motor; the controller adapted to send, in response to electrical signals from the motor and from the detector indicating the exercise mode, and in accordance with a control mechanism, electrical signals to the motor to cause the motor to apply a resisting torque to one or more of the plurality of wheels.

167. The powered roller skate of claim 166, wherein the detector is adapted to detect a user-desired exercise level.

168. An electrically powered personal transportation system comprising two roller skates, wherein each roller skate includes:

a foot support adapted to be worn on a single foot of a user;

a plurality of wheels rotatably mounted to the foot support for skating thereon;

a wheel locking mechanism mechanically coupled to at least one of the wheels;

an electric motor coupled to at least one of the wheels; and an active control system including:
- a sensor; and
- a controller coupled to the sensor and to the motor; the controller adapted to send, in response to electrical signals from the sensor and electrical signals from the motor indicating the state of the motor, and in accordance with a control mechanism, electrical signals to the motor to control operation of the motor.

169. A method of operating a powered roller skate comprising the steps of:

sensing skating motions of a wearer of the skate, detecting a state of a motor coupled to at least one wheel of the skate, and controlling the motor in response to the sensed skating motions and the detected state of the motor.

170. The method according to claim 169, wherein the step of sensing skating motions includes sensing weight distribution across a foot support of the skate.

171. The method according to claim 170, wherein the step of controlling the motor includes causing the motor to increase and decrease motor velocity as a function of the sensed weight distribution across the foot support.

172. The method according to claim 170, wherein the step of controlling the motor includes
- causing the motor to increase motor velocity as a function of the sensed weight distribution on a forward portion of the foot support when the sensed weight distribution is greater than a first predetermined threshold, and
- causing the motor to decrease motor velocity as a function of the sensed weight distribution on a rearward portion of the foot support when the sensed weight distribution is greater than a second predetermined threshold.

173. The method according to claim 169, wherein the step of sensing skating motions includes detecting when the wearer sets the skate down on a surface, and wherein the step of detecting a state of the motor includes determining a motor velocity established when the skate was set down.

174. The method according to claim 173, wherein the step of controlling the motor includes setting motor torque to cause the motor to maintain the motor velocity of the skate when the skate was set down.

175. The method according to claim 169, wherein the step of sensing the skating motions includes detecting when the wearer is stationary, and wherein the step of controlling the motor includes causing the motor to impose a motor torque that prevents at least one of the wheels from moving.

176. The method according to claim 175, further including sensing a restart trigger, and wherein the step of controlling the motor includes causing the motor to allow the wheel to move in response to the sensed restart trigger.

177. The method according to claim 169, wherein the step of sensing skating motions includes sensing changes in lateral weight distribution of the wearer across a foot support of the skate.

178. The method according to claim 177, wherein the step of controlling the motor includes causing the motor to turn the wheel in response to sensed changes in the lateral weight distribution.

179. The method according to claim 169, wherein the step of sensing skating motions includes sensing an angle between the foot and lower leg of the wearer.

180. The method according to claim 179, wherein the step of controlling the motor includes
causing the motor to accelerate as a function of said angle when the angle is less than a first predetermined threshold, and
causing the motor to decelerate as a function of said angle when the angle is greater than a second predetermined threshold.

181. The method according to claim 169, wherein the step of detecting the state of the motor includes detecting motor torque.

182. The method according to claim 169, wherein the step of detecting the state of the motor includes detecting angular velocity of the motor.

183. The method according to claim 169 further comprising
determining an operational mode of the skate, wherein the step of controlling the motor is further in response to the determined operational mode.

184. The method according to claim 183, wherein the step of detecting the state of the motor includes detecting when the skate is stationary, and wherein, in response to the determined operational mode, the step of controlling the motor includes causing the motor to impose a motor torque that prevents said wheel from moving.

185. The method according to claim 184, further including sensing a restart trigger, and wherein the step of controlling the motor includes causing the motor to allow the wheel to move in response to the sensed restart trigger.

186. The method according to claim 183, wherein the step of detecting the state of the motor includes detecting a motor friction, and wherein, in response to the determined operational mode, the step of controlling the motor includes setting motor torque to compensate for the detected motor friction.

187. The method according to claim 183, wherein the step of sensing skating motion includes detecting when the wearer sets the skate down on a surface, the step of detecting the state of the motor including detecting a motor velocity established when the skate was set down, and wherein, in response to the determined operational mode, the step of controlling the motor includes setting motor torque to cause the motor to maintain the motor velocity of the skate when the skate was set down.

188. The method according to claim 183, wherein the step of sensing skating motions includes sensing weight distribution of the wearer across a foot support of the skate, and wherein, in response to the determined operational mode, the step of controlling the motor includes causing the motor to increase and decrease motor velocity as a function of the sensed weight distribution across the foot support.

189. The method according to claim 183, wherein the step of sensing skating motions includes sensing weight distribution of the wearer across a foot support of the skate, and wherein, in response to the determined operational mode, the step of controlling the motor includes
causing the motor to increase motor velocity as a function of the sensed weight distribution on a forward portion of the foot support when the sensed weight distribution is greater than a first predetermined threshold on the forward portion, and
causing the motor to decrease motor velocity as a function of the sensed weight distribution on a rearward portion of the foot support when the sensed weight distribution is greater than a second predetermined threshold on the rearward portion.

190. The method according to claim 183, wherein the step of sensing skating motions includes sensing an angle between the foot and lower leg of the wearer, and wherein, in response to the determined operational mode, the step of controlling the motor includes causing the motor to increase and decrease motor velocity as a function of the sensed angle.

191. The method according to claim 183, wherein the step of sensing skating motions includes sensing an angle between the foot and lower leg of the wearer, and wherein, in response to the determined operational mode, the step of controlling the motor includes causing the motor to increase and decrease motor acceleration as a function of the sensed angle.

192. The method according to claim 183, wherein the step of sensing skating motions includes sensing an angle between the foot and lower leg of the wearer, and wherein, in response to the determined operational mode, the step of controlling the motor includes
causing the motor to increase motor acceleration as a function of the sensed angle when the angle is less than a first predetermined threshold, and
causing the motor to increase motor braking as a function of the sensed angle when the angle is greater than a second predetermined threshold.

193. The method according to claim 183, wherein the step of sensing skating motions includes sensing a distance between the powered roller skate and another roller skate, and wherein, in response to the determined operational mode, the step of controlling the motor includes causing the motor to increase and decrease motor velocity as a function of the sensed distance.

194. The method according to claim 183, wherein the step of sensing skating motions includes sensing a distance between the powered roller skate and another roller skate, and wherein, in response to the determined operational mode, the step of controlling the motor includes causing the motor to increase and decrease motor acceleration as a function of the sensed distance.

195. The method according to claim 183, wherein the step of sensing skating motions includes sensing a distance between the powered roller skate and another roller skate, and wherein, in response to the determined operational mode, the step of controlling the motor includes
causing the motor to increase motor velocity as a function of the sensed distance when the distance is greater than a first predetermined threshold, and causing the motor to decrease motor velocity as a function of the sensed distance when the distance is less than a second predetermined threshold.

196. The method according to claim 183, wherein the step of sensing skating motions includes sensing a distance between the powered roller skate and another roller skate, and wherein, in response to the determined operational mode, the step of controlling the motor includes causing the motor to increase motor acceleration as a function of the sensed distance when the distance is greater than a first predetermined threshold, and causing the motor to increase motor braking as a function of the sensed distance when the distance is less than a second predetermined threshold.

197. The method according to claim 183, wherein the step of sensing skating motions includes sensing an exercise mode, and wherein, in response to the determined exercise mode, the step of controlling the motor includes causing the motor to apply resisting torque to a rotating rear axle of the powered roller skate.

198. The method according to claim 169, further comprising sensing a start trigger, and wherein the step of controlling the motor causes the motor to accelerate in response to the sensed start trigger.

199. The method according to claim 169, further comprising communicating status information to the wearer.

200. The method according to claim 169, further comprising communicating status information with another powered roller skate.

201. The method according to claim 169, further comprising communicating status information with an input/output port.

202. The method according to claim 169, further comprising communicating status information with a telephone system.

203. The method according to claim 169, further comprising detecting an end-of-use trigger, and preventing, in response to said trigger, said wheel from moving.

204. The method according to claim 169, further comprising detecting a predetermined pattern of pressure on a pressure sensor, and wherein the motor is controlled in response to the detected predetermined pattern of pressure.

205. The method according to claim 169, further comprising detecting a predetermined pattern of wearer leg orientations, and wherein the motor is controlled in response to the detected predetermined pattern of orientations.

206. The method according to claim 169, further comprising detecting pressure on a braking sensor, and wherein the motor is controlled in response to the detected pressure on the braking sensor to establish a reverse torque to decelerate the skate as a function of the detected pressure.

207. The method according to claim 169, further comprising sensing motor temperature, and wherein the step of controlling the motor, in response to sensing a motor temperature above a predetermined threshold, causes the motor controller to limit motor current to prevent excessive motor temperature.

208. The method according to claim 169, further comprising sensing motor temperature, and wherein the step of controlling the motor, in response to sensing a motor temperature below a predetermined threshold, prevents the motor from operating.

209. The method according to claim 169, further comprising sensing a battery pack temperature, and wherein the step of controlling the motor, in response to sensing a battery pack temperature above a predetermined threshold, causes the battery controller to limit current to prevent excessive battery temperature.

210. The method according to claim 169, further comprising sensing electronics temperature, and wherein the step of controlling the motor, in response to sensing an electronics temperature above a predetermined threshold, causes the electronics controller to limit current to prevent excessive controller temperature.

211. The method according to claim 169, further comprising sensing skate orientation, wherein the step of controlling the motor, in response to sensing a skate orientation outside of a predetermined range, causes the motor to establish a reverse torque to decelerate the skate.

212. The method according to claim 169, further comprising sensing shocks applied to the skate, and wherein the step of controlling the motor, in response to sensing a shock above a predetermined threshold, causes the motor to establish a reverse torque to decelerate the skate as a function of the sensed shock.

213. The method according to claim 169, further comprising sensing shocks applied to the skate, and wherein the motor is controlled in response to a predetermined pattern of sensed shocks.

214. The method according to claim 169, wherein the motor is controlled in response to a plurality of operational parameters.

215. The method according to claim 169, further comprising preventing reverse movement of one or more of a plurality of wheels of the skate.

216. The method according to claim 169, further comprising detecting a backward thrust on one or more of a plurality of wheels of the skate, and wherein the motor is controlled in response to the detected backward thrust, thereby causing the motor to establish a reverse torque to decelerate the skate as a function of the detected backward thrust.

217. A method of operating a pair of powered roller skates, each skate having a motor coupled to at least one wheel of the skate, the method comprising the steps of sensing skating motions of a wearer of the skates, detecting a state of the motors, communicating the sensed skating motion and detected state of the motors to the pair of roller skates, and controlling the motors in response to the sensed skating motion and detected motor state.

218. The method according to claim 217, wherein the step of sensing skating motions includes sensing a relative position of each skate.

219. The method according to claim 218, wherein the motors are controlled in response to the sensed relative position of each skate, thereby decreasing a velocity of a designated forward one of the pair of skates when a distance between the designated forward skate and a rearward one of the pair of skates exceeds a predetermined threshold.

220. The method according to claim 218, wherein the motors are controlled in response to the sensed relative position of each skate, thereby increasing a velocity of a designated rearward one of the pair of skates when a distance between the designated rearward skate and a forward one of the pair of skates exceeds a predetermined threshold.

221. The method according to claim 217, wherein the step of motors includes coordinating velocity changes between the pair of skates.

222. The method according to claim 217, wherein the step of controlling the motors includes coordinating braking between the pair of skates.

223. The method according to claim 217, wherein the step of controlling the motors includes maintaining velocity of the wearer with a rearward one of the pair of skates, changing the velocity of the wearer through movement of a forward one of the pair of skate, and coordinating velocity changes between the pair of skates.

* * * * *